(12) United States Patent
Thomas

(10) Patent No.: US 12,412,420 B2
(45) Date of Patent: Sep. 9, 2025

(54) APPARATUS, SYSTEMS, AND METHODS FOR MICROPHONE GAIN CONTROL FOR ELECTRONIC USER DEVICES

(71) Applicant: Intel Corporation, Santa Clara, CA (US)

(72) Inventor: Tigi Thomas, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 753 days.

(21) Appl. No.: 17/358,894

(22) Filed: Jun. 25, 2021

(65) Prior Publication Data

US 2021/0318850 A1    Oct. 14, 2021

(51) Int. Cl.
G06V 40/16  (2022.01)
G06F 3/00   (2006.01)
G06F 3/01   (2006.01)
G10L 21/0356 (2013.01)

(52) U.S. Cl.
CPC ............ *G06V 40/168* (2022.01); *G06F 3/005* (2013.01); *G06F 3/013* (2013.01); *G10L 21/0356* (2013.01)

(58) Field of Classification Search
None
See application file for complete search history.

(56) References Cited

U.S. PATENT DOCUMENTS

| | | | |
|---|---|---|---|
| 4,811,404 A * | 3/1989 | Vilmur | G10L 21/0208 704/226 |
| 6,363,344 B1 * | 3/2002 | Higuchi | G10L 21/0208 704/226 |
| 6,593,956 B1 | 7/2003 | Potts | |
| 8,681,203 B1 | 3/2014 | Yin et al. | |
| 9,197,974 B1 * | 11/2015 | Clark | H04R 29/004 |
| 9,298,974 B1 | 3/2016 | Kuo | |
| 10,027,883 B1 * | 7/2018 | Kuo | H04N 23/63 |
| 10,027,888 B1 * | 7/2018 | Mackraz | G06V 10/25 |
| 10,440,324 B1 | 10/2019 | Lichtenberg | |

(Continued)

FOREIGN PATENT DOCUMENTS

| | | |
|---|---|---|
| CN | 111754990 A | 10/2020 |
| WO | 2011123757 A1 | 10/2011 |
| WO | 2022067293 A1 | 3/2022 |

OTHER PUBLICATIONS

Feng et al., "Face Detection, Bounding Box Aggregation and Pose Estimation for Robust Facial Landmark Localisation in the Wild," 2017 IEEE Conference on Computer Vision and Pattern Recognition Workshops (CVPRW), 2017, pp. 160-169, 10 pages.

(Continued)

*Primary Examiner* — Jesse S Pullias
(74) *Attorney, Agent, or Firm* — Hanley, Flight & Zimmerman, LLC

(57) ABSTRACT

Apparatus, systems, and methods for microphone gain control for electronic user devices are disclosed. An example apparatus includes at least one memory, instructions in the apparatus, and processor circuitry to execute the instructions to determine a proximity of a user to a user device based on an image generated via one or more cameras associated with the user device, determine an amount of gain to be applied to an audio signal generated by a microphone associated with the user device based on the proximity of the user, and cause an amplifier of the user device to apply the gain to the audio signal.

20 Claims, 18 Drawing Sheets

(56) References Cited

U.S. PATENT DOCUMENTS

| | | | |
|---|---|---|---|
| 10,819,950 B1 | 10/2020 | Lichtenberg et al. | |
| 10,820,795 B1* | 11/2020 | Weise | G06V 20/64 |
| 11,252,374 B1 | 2/2022 | Lichtenberg et al. | |
| 2003/0035001 A1 | 2/2003 | Van Geest | |
| 2008/0002948 A1 | 1/2008 | Murata | |
| 2008/0136895 A1 | 6/2008 | Mareachen | |
| 2008/0260131 A1 | 10/2008 | Akesson | |
| 2008/0279425 A1* | 11/2008 | Tang | G06V 40/16 382/118 |
| 2009/0015658 A1 | 1/2009 | Enstad | |
| 2010/0123785 A1 | 5/2010 | Chen | |
| 2011/0161074 A1 | 6/2011 | Pance et al. | |
| 2011/0316996 A1 | 12/2011 | Abe | |
| 2012/0150333 A1 | 6/2012 | De Luca | |
| 2012/0183161 A1 | 7/2012 | Agevik | |
| 2013/0156209 A1* | 6/2013 | Visser | H04M 9/082 381/66 |
| 2013/0202130 A1* | 8/2013 | Zurek | H04M 1/605 381/94.3 |
| 2014/0169627 A1* | 6/2014 | Gupta | G06V 20/588 382/103 |
| 2014/0337016 A1* | 11/2014 | Herbig | G10L 25/27 704/201 |
| 2014/0341547 A1 | 11/2014 | Shenoy | |
| 2015/0131803 A1 | 5/2015 | Weksler et al. | |
| 2015/0264299 A1* | 9/2015 | Leech | H04N 7/0117 348/78 |
| 2015/0296319 A1* | 10/2015 | Shenoy | H04R 3/005 381/303 |
| 2016/0073054 A1 | 3/2016 | Balasaygun et al. | |
| 2016/0195856 A1* | 7/2016 | Spero | G05B 15/02 700/90 |
| 2017/0127035 A1 | 5/2017 | Kon et al. | |
| 2017/0186441 A1 | 6/2017 | Wenus | |
| 2017/0201825 A1 | 7/2017 | Whyte | |
| 2018/0084365 A1 | 3/2018 | Ugur | |
| 2018/0144746 A1 | 5/2018 | Mishra et al. | |
| 2018/0310114 A1 | 10/2018 | Eronen | |
| 2019/0172462 A1 | 6/2019 | Mishra | |
| 2019/0313014 A1* | 10/2019 | Welbourne | G06V 40/70 |
| 2019/0394606 A1 | 12/2019 | Tammi | |
| 2020/0028884 A1 | 1/2020 | Childers et al. | |
| 2020/0110572 A1 | 4/2020 | Lenke et al. | |
| 2020/0137489 A1 | 4/2020 | Sheaffer | |
| 2020/0145617 A1 | 5/2020 | Zavesky et al. | |
| 2020/0184987 A1 | 6/2020 | Kupryjanow et al. | |
| 2020/0314483 A1 | 10/2020 | Rakshit et al. | |
| 2020/0393159 A1 | 12/2020 | Takayanagi | |
| 2021/0092517 A1 | 3/2021 | Kulkarni et al. | |
| 2021/0116983 A1 | 4/2021 | Hallberg et al. | |
| 2021/0321212 A1 | 10/2021 | Li | |
| 2022/0059071 A1 | 2/2022 | Pearce et al. | |
| 2022/0060525 A1 | 2/2022 | Chavez et al. | |
| 2022/0159403 A1 | 5/2022 | Sporer | |
| 2022/0239848 A1 | 7/2022 | Swierk et al. | |
| 2022/0295012 A1 | 9/2022 | Swierk et al. | |
| 2022/0319063 A1 | 10/2022 | Mizobuchi et al. | |
| 2023/0103060 A1 | 3/2023 | Chaudhuri | |

OTHER PUBLICATIONS

United States Patent and Trademark Office, "Final Office Action," issued in connection with U.S. Appl. No. 17/483,552, dated Feb. 13, 2025, 12 pages.

European Patent Office, "Communication pursuant to Article 94(3) EPC," issued in connection with European Patent Application No. 22191774.3, Mar. 10, 2025, 7 pages.

"A Method and Apparatus for Smart Auto-Mute of Conference Participants," IP.com Prior Art Database Technical Disclosure, May 1, 2014, 12 pages.

European Patent Office, "European Search Report," issued in connection with European patent application No. 22191774.3, Feb. 20, 2023, 8 pages.

United States Patent and Trademark Office, "Non-Final Office Action," issued in connection with U.S. Appl. No. 17/483,552, dated Oct. 25, 2024, 9 pages.

Warusfel, "Listen HRTF Database," dated Sep. 6, 2002, updated May 25, 2003, retrieved from http://recherche.ircam.fr/equipes/salles/listen/, 1 page.

United States Patent and Trademark Office, "Non-Final Office Action," issued in connection with U.S. Appl. No. 17/475,235, dated Oct. 30, 2024, 15 pages.

United States Patent and Trademark Office, "Final Office Action," issued in connection with U.S. Appl. No. 17/475,235, dated Feb. 11, 2025, 19 pages.

United States Patent and Trademark Office, 0"Notice of Allowance and Fee(s) Due," issued in connection with U.S. Appl. No. 17/483,552, dated Jul. 1, 2025, 9 pages.

* cited by examiner

APPARATUS, SYSTEMS, AND METHODS FOR MICROPHONE GAIN CONTROL FOR ELECTRONIC USER DEVICES

FIELD OF THE DISCLOSURE

This disclosure relates generally to electronic user devices and, more particularly, to apparatus, systems, and methods for microphone gain control for electronic user devices.

BACKGROUND

An electronic user device such as a laptop includes one or more microphones to capture audio such as a voice of a user of the device. The microphone(s) can be used during a video call in which an image of the user is captured via camera(s) of the electronic user device in addition to the audio captured by the microphone(s).

BRIEF DESCRIPTION OF THE DRAWINGS

The figures are not to scale. In general, the same reference numbers will be used throughout the drawing(s) and accompanying written description to refer to the same or like parts.

Figure 1:
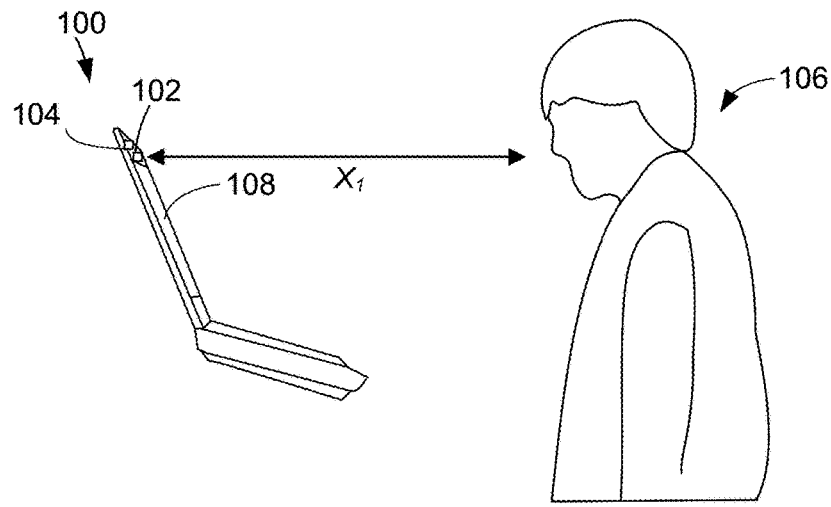
FIG. 1 illustrates an example user device constructed in accordance with teachings of this disclosure and, in particular, illustrates a first interaction between a user and a microphone of the user device.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

An electronic user device such as a laptop, tablet, or smartphone includes one or more microphones (e.g., a built-in microphone array) to capture sound such as speech by a user of the device and/or sounds in an environment in which the device is located. The microphones convert the sound into electrical signal(s) for processing by processor circuitry of the user device. The user device may include user applications such as a video conferencing application installed thereon. During a video conference, the microphone(s) of the device capture voice-generated sound (e.g., speech) of the user while one or more camera(s) of the electronic user device capture image(s) (e.g., video) of the user.

In some instances, an audio signal level output by the microphone(s) of the user device and representing the user's voice during a video conference is subject to fluctuation as the user (i.e., speaker) changes position with respect to the user device and, thus, the microphone(s). For instance, as the user moves toward the microphone(s), the signal level output by the microphone(s) increases. As the user moves away from the microphone(s), the signal level output by the microphone(s) decreases. The fluctuating signal level of the captured sound can affect characteristics of the voice audio transmitted to and output by user devices associated with other participants of the video conference. For instance, when the speaker is close to the microphone(s), the voice audio of the speaker transmitted to the other user device(s) can be associated with higher volume than when the speaker is farther away from the microphone(s).

In some cases, the electrical signal(s) output by the microphone(s) are amplified before processing by the processor circuitry of the user device. An amplifier applies a gain to the microphone signal to increase the signal level. Gain is a measurement of an ability of an amplifier to increase an amplitude of a signal from an input port to an output port (e.g., by adding energy to the signal). The amplifier applies gain to an input signal to increase an amplitude of the signal at the output of the amplifier. Microphone gain is the gain applied by the amplifier to microphone signal(s) to increase the amplitude of the signal(s). As a result of the increased gain, a loudness of a voice captured in the microphone signal(s) can be increased.

Some known electronic user devices include microphone gain control systems to adjust microphone gain in view of fluctuations in microphone input signal(s). For instance, automatic gain control (AGC) uses signal level-based analysis to dynamically increase or decrease the gain applied to a signal in view of a microphone output signal level range threshold. For instance, an AGC system may detect an input signal level below a threshold output level range and instruct the amplifier to apply a gain based on the threshold. However, AGC control systems do not discriminate input signals based on audio type. Therefore, the AGC system may adjust the gain on the input signal without discriminating between, for instance, frequency differences between background noise and a speaker's voice during a video conference. For example, an AGC system may detect a low amplitude input audio signal that corresponds to a background noise such as a footsteps or noise generated by an air conditioning unit. Because this input signal level is below the threshold output signal level range, the AGC may instruct the amplifier to increase the gain to applied to the audio signal, which can distort the voice audio that is also captured in the audio signal and transmitted to the user device(s) of the other video conference attendee(s).

Disclosed herein are example apparatus, systems, and methods that provide for dynamic microphone gain control based on a proximity of a user (i.e., a speaker) to a camera associated with the user device. In examples disclosed herein, image data is generated by a video camera associated with the device (e.g., a built-in video camera, a separate camera that is an accessory to the user device) during, for instance, a video conference. Also, during the video conference, audio data from the user is captured via microphone(s) associated with the device (e.g., a built-in microphone array). Examples disclosed herein include user proximity detection circuitry to analyze the image data to detect a proximity of the user relative to the camera. Although examples disclosed herein are discussed in connection with video data, other types of image data (e.g., still image data) could be used.

Examples disclosed herein include microphone gain control circuitry to determine an amount of gain by which the audio signal output by the microphone(s) should be adjusted based on the proximity of the user to the camera. In examples disclosed herein, the microphone gain control circuitry instructs an amplifier to apply the gain of the microphone audio signal to provide a signal in which an audio output level of the user's voice is independent of the position of the user relative to the camera. As a result, fluctuations in the volume level of the speaker's voice as perceived by other participants in the video conference due to changes in the distance of the speaker from the device are reduced or substantially eliminated.

Examples disclosed herein determine user proximity based on detection of landmarks in the image data generated by the camera(s) of the device. Some examples disclosed herein detect a user's face in the image data and identify landmarks with respect to the user's face via image recognition analysis. The facial landmarks can include, for example, a location of the user's two eyes. Some examples disclosed herein determine a distance between corresponding points identified at the user's right and left eyes. For instance, a first point located at an edge of a user's right eye proximate to the user's nose and a second, opposite point at an edge of the user's left eye proximate the user's nose can be identified in the image data. A distance between the first point and the second point is used to determine (e.g., estimate) a size (e.g., width) of the user's nose bridge in pixels. The size of the user's nose bridge as detected from the image data can serve as an indicator of a proximity of the user to the camera. The nose bridge can be selected as a proxy for determining user distance from the camera because a width of the nose bridge may have less variance across demographics (e.g., genders, nationalities) than other facial features; however, other facial features could alternatively be used to determine user proximity.

In some examples, the image data can include multiple individuals. In such examples, one of the individuals may be identified as or predicted to be the speaker based on, for example, an analysis of sizes of bounding boxes associated with each user during image analysis.

Examples disclosed herein correlate the amount of gain to be applied to the audio signal with the proximity of the face the user (i.e., the speaker) to the camera. In some examples disclosed herein, the gain applied to a voice band of the audio signal generated by the microphone(s) is increased when the proximity of the user to the camera is determined to be greater than a threshold distance from the camera. Conversely, a gain applied to the voice band of the microphone audio signal is decreased when the proximity of the user to the camera is less than a threshold distance from the camera. The proximity-based adjustments to the gain provide for a substantially consistent voice level output in the audio signal data that is transmitted to other user devices (e.g., devices associated with other participants of a video conference). Examples disclosed herein provide for user proximity detection using image data collected during video calls rather than using separate proximity sensors that would increase computing resources. Thus, examples disclosed herein provide for efficient use of computer resources to adjust microphone gain based on user proximity.

FIG. 1 illustrates an example user device 100 constructed in accordance with teachings of this disclosure for applying dynamic microphone gain control based on user proximity sensing. In the example of FIG. 1, the user device 100 is a laptop. However, the user device 100 can include other types personal computing (PC) devices such as a desktop, an electronic tablet, a hybrid or convertible PC, etc. In some examples, the user device 100 includes a mobile device such as a smartphone.

The example user device 100 includes one or more microphones 102. The microphones 102 provide means for detecting sounds in the environment in which the user device 100 is located. In some examples, the user device 100 includes two or more microphones defining a microphone array. The microphone(s) 102 can be carried by the user device 100 on, for example, one or more sides of a lid of the device 100. In other examples, the microphone(s) 102 are an accessory removably coupled to one or portions of the user device 100.

The example user device 100 of FIG. 1 includes a display screen 108 to present graphical content to a user 106 of the user device 100. The example user device 100 of FIG. 1 includes one or more camera(s) 104. The camera(s) 104 provide means for generating image data. In the example of FIG. 1, the user device 100 includes a user-facing camera 104 positioned proximate to the display screen 108 of the user device 100 such that when a user 106 faces the display screen 108, the user is within a field of view of the camera 104. The camera(s) 104 of the user device 100 can include a video camera. Although in the example of FIG. 1, the camera 104 is integrated with (e.g., built-into) a housing of the user device 100, in other examples, the camera(s) 104 are removably coupled to one or portions of the user device 100. For example, a camera 104 (e.g., a webcam) can be coupled to the user device 100 (e.g., to a lid of a laptop, to a monitor of a desktop).

In the example of FIG. 1, the microphone(s) 102 can be used to output audio signal(s) in response to sound (e.g., speech) captured from the user 106 (the terms "user" and "subject" are used interchangeably herein and both refer to a human being). Also, the camera(s) 104 of the user device 100 can generate image data including at least a portion of the user 106 such as a face of the user 106. In some examples, the microphone(s) 102 and the camera(s) 104 are used by a teleconference application (e.g., a video conference application) installed on the user device 100 such that sound and image data associated with the user 106 are captured by the microphone(s) 102 and the camera(s) 104, respectively, and processed by the user device 100 for transmission to user device(s) associated with other participant(s) of the teleconference.

In the example of FIG. 1, an amplitude of audio signal output by the microphone(s) 102 in response to sound captured from the user 106 can vary based on a position of the user 106 relative to the microphone(s) 102 of the user device 100 even if the user 106 is making the same sound at the same volume level. In examples disclosed herein, image data generated by the camera(s) 104 associated with the user device 100 can be used to determine a distance of the user 106 from the camera(s) 104 and, thus, the microphone(s) 102 of the user device 100. For instance, in the example of FIG. 1, the user 106 is in a first position in which the user 106 is a first distance $X_1$ from the camera(s) 104 of the user device 100. As a result, the audio signal(s) generated by the microphone(s) 102 that captures a voice of the user 106 when the user 106 is speaking while in the first position of FIG. 1 are associated with a first audio signal level.

Figure 2:
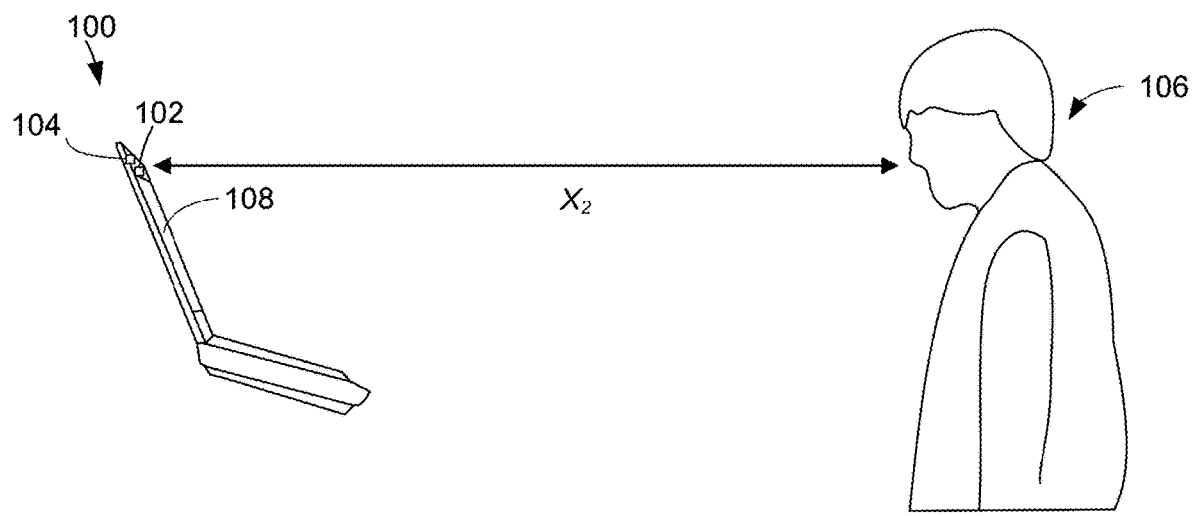
FIG. 2 illustrates the example user device of FIG. 1 and, in particular, illustrates a second interaction between the user and a microphone of the user device.

In FIG. 2, the user 106 is positioned a second distance $X_2$ from the camera(s) 104 of the user device 100. The second distance $X_2$ of the user 106 from the camera(s) 104 shown in FIG. 2 is greater than the first distance $X_1$ of the user 106 from the camera(s) 104 shown in FIG. 1. Put another way, the user 106 is farther from the camera(s) 104 in FIG. 2 than in FIG. 1 and, thus, father from the user device 100 including the microphone(s) 102 in FIG. 2 than in FIG. 1. As a result, the audio signal(s) generated by the microphone(s) 102 that capture the voice of the user 106 when the user 106 is speaking while in the second position of FIG. 2 are associated with a second audio signal level. For example, an amplitude of the audio corresponding to the voice of the user 106 when the user 106 is in the second position of FIG. 2 may be less than the amplitude of the audio corresponding to the voice of the user 106 when the user is in the first position of FIG. 1 even if the user is making the exact same sound at the exact same volume due to the increased distance of the user 106 from the microphone(s) 102.

Figure 3:
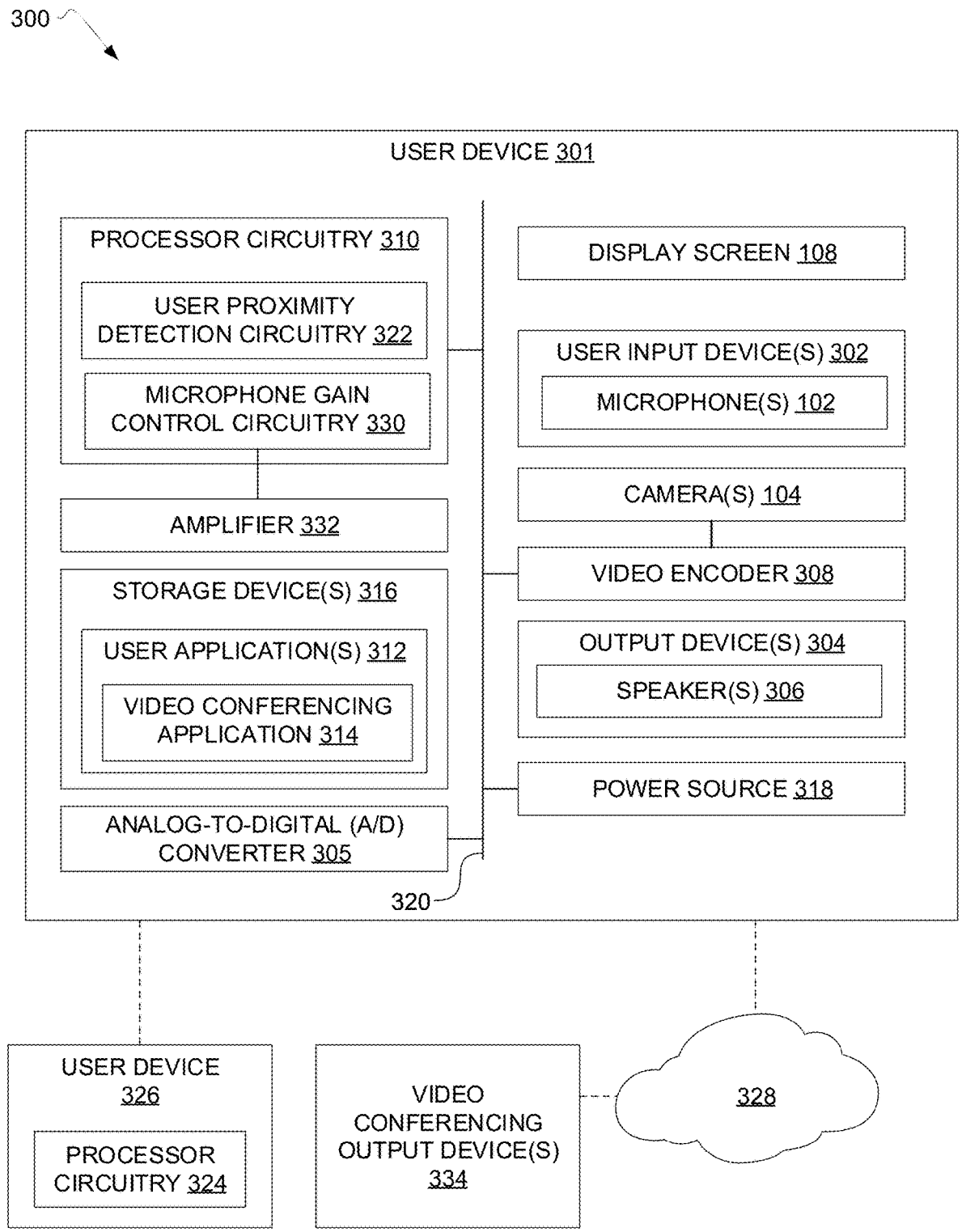
FIG. 3 illustrates an example system constructed in accordance with teachings of this disclosure and including a user device, user proximity detection circuitry for detecting user proximity relative to the device, and microphone gain control circuitry for controlling microphone gain in response to the user proximity detection in accordance with teachings of this disclosure.

FIG. 3 illustrates an example system 300 constructed in accordance with teachings of this disclosure for controlling microphone gain in response to user proximity to a user device associated with the microphone(s). The example system 300 of FIG. 3 includes a user device 301 (e.g., the user device 100 of FIG. 1). As discussed in connection with FIG. 1, the user device 301 can be a personal computing device such as a laptop, a desktop computer, an electronic tablet, a smartphone, etc.

The example user device 301 includes the display screen 108. In some examples, the display screen 108 is a touch screen that enables a user (e.g., the user 106 of FIG. 1) to interact with data presented on the display screen 108 by touching the display screen 108 with a stylus and/or one or more fingers or a hand of the user. Additionally or alternatively, the user can interact with data presented on the display screen 108 via user input device(s) 302 such as the microphone(s) 102, a keyboard, a mouse, touch pad, etc. The example user device 301 includes one or more output device(s) 304 such as speaker(s) 306 to provide audible outputs to the user of the user device 301.

The example user device 301 of FIG. 3 includes processor circuitry 310. The processor circuitry 310 of the example user device 301 is a semiconductor-based hardware logic device. The hardware processor circuitry 310 may implement a central processing unit (CPU) of the user device 301, may include any number of cores, and may be implemented, for example, by a processing commercially available from Intel® Corporation. The processor circuitry 310 executes machine readable instructions (e.g., software) including, for example, user application(s) 312 such as a video conferencing application 314 installed on the user device 301. The user application(s) 312 are stored in one or more storage devices 316 such as non-volatile memory (e.g., flash memory). The example user device 301 of FIG. 3 includes a power source 318 such as a battery and/or transformer and AC/DC converter to provide power to the processor circuitry 310 and/or other components of the user device 301 communicatively coupled via a bus 320.

The example user device 301 of FIG. 3 includes the camera(s) 104. The example user device 301 of FIG. 3 includes a video encoder 308 to process image data output by the camera(s) 104. As disclosed in connection with FIGS. 1 and 2, the camera(s) 104 generate image data including at least a portion of one or more users (e.g., the user 106) of the user device 301. Also, the microphone(s) 102 output audio signal(s) including the voice(s) of the user(s) while interacting with the video conferencing application 314. The example user device 301 of includes an analog-to-digital (A/D) converter 305 to convert analog signals from the microphone(s) 102 to digital signal(s).

In the example of FIG. 3, image data generated by the camera(s) 104 of the user device 301 (e.g., during use of the video conferencing application 314) and processed by the video encoder 308 is passed to user proximity detection circuitry 322 to determine a position of a user (e.g., the user 106) relative to the camera(s) 104 of the user device 301. The example user proximity detection circuitry 322 analyzes the image data to detect the face(s) of user(s) captured in the image data. The image data including the face(s) is analyzed by the example user proximity detection circuitry 322 to identify a speaker based on bounding box analysis and to estimate a size of certain features of the face of the speaker in the image in pixels, such as size (e.g., width) of the speaker's nose bridge. Based on the size of the facial features, the example user proximity detection circuitry 322 estimates a distance of the speaker to the camera(s) 104 of the user device 301. The estimated or predicted user proximity value is used to control an amount of gain control applied to the audio signal capturing the speaker's voice.

In the example of FIG. 3, the user proximity detection circuitry 322 is implemented by executable instructions executed on the processor circuitry 310 of the user device 301. However, in other examples, the user proximity detection circuitry 322 is implemented by processor circuitry 324 of another user device 326 (e.g., a smartphone, an edge device, a wearable device, etc.) in communication with the user device 301 (e.g., via wired or wireless communication protocols), and/or by a cloud-based device 328 (e.g., one or more server(s), processor(s), and/or virtual machine(s)). In other examples, the user proximity detection circuitry 322 is implemented by dedicated circuitry located on the user device 301 and/or the user device 326. These components may be implemented in software, hardware, or in any combination of two or more of software, firmware, and/or hardware.

In the example of FIG. 3, the user proximity estimation determined by the user proximity detection circuitry 322 is passed to microphone gain control circuitry 330. In the example of FIG. 3, the microphone gain control circuitry 330 determines an amount of gain by which the audio signal(s) output by the microphone(s) 102 (e.g., during use of the video conferencing application 314) should be adjusted based on the user proximity estimation. The microphone gain control circuitry 330 generates instructions that cause an amplifier 332 of the user device 301 to adjust the gain of the audio signal(s) generated by the microphones(s) 102. The amplifier 332 provides means for amplifying the audio signal(s) by, for instance, applying gain to the audio signal(s). The example microphone gain control circuitry 330 of FIG. 1 analyzes the audio data output by the microphone(s) 102 to estimate a noise level (e.g., ambient noise level) in the audio data. The microphone gain control circuitry 330 compares a voice band signal level in the audio data to the noise level to determine a signal-to-noise ratio of the audio signal(s) output by the microphone(s) 102. In the example of FIG. 3, if the signal-to-noise ratio is below a threshold, the microphone gain control circuitry 330 refrains from causing the amplifier 332 to adjust the gain of the audio signal(s) to prevent amplification of ambient noise.

The example microphone gain control circuitry 330 of FIG. 3 can perform other types of audio signal processing and/or analysis. For instance, the microphone gain control circuitry 330 of FIG. 3 can include a filter to filter the audio data (e.g., apply a low pass filter) to remove components of the audio data outside of a voice band (e.g., a range of audio frequencies in the audio signal that is associated with speech). In such examples, the gain adjustment(s) are applied to the filtered audio data signal(s). Thus, as a result of the processing of the audio signals by the microphone gain control circuitry 330, the amplifier 332 adjusts the gain of the voice band in the signal data based on user proximity and in view of variables such as a signal-to-noise ratio of the audio data.

In the example of FIG. 3, the microphone gain control circuitry 330 is implemented by executable instructions executed on the processor circuitry 310 of the user device 301. However, in other examples, microphone gain control circuitry 330 is implemented by the processor circuitry 324 of the other user device 326 and/or by the cloud-based device(s) 328 (e.g., one or more server(s), processor(s), and/or virtual machine(s)). In other examples, the user proximity detection circuitry 322 is implemented by dedicated circuitry located on the user device 301 and/or the user device 326. These components may be implemented in software, hardware, or in any combination of two or more of software, firmware, and/or hardware.

In some examples, the amplifier 332 is implemented by the processor circuitry 310. In other examples, the amplifier 332 is implemented by dedicated circuitry.

In the example of FIG. 3, the audio data including the adjusted gain as determined by the microphone gain control circuitry 330 and applied by the amplifier 332 is transmitted to one or more video conferencing output device(s) 334 (e.g., laptops, smartphones, etc. associated with other participants of the video conference). The audio data may be transmitted to the video conferencing output device(s) 334 via one or more protocol(s) (e.g., voice-over-internet protocol(s)) associated with the video conferencing application 314. As a result of the user-proximity based gain control provided by the microphone gain control circuitry 330, fluctuations in the audio level of the voice of the speaker (e.g., the user 106) output at the video conferencing output device(s) 334 (e.g., by speaker(s) of the video conferencing output device(s) 334) due to changes in the distance of the speaker relative to the user device 301 are reduced or substantially eliminated.

Figure 4:
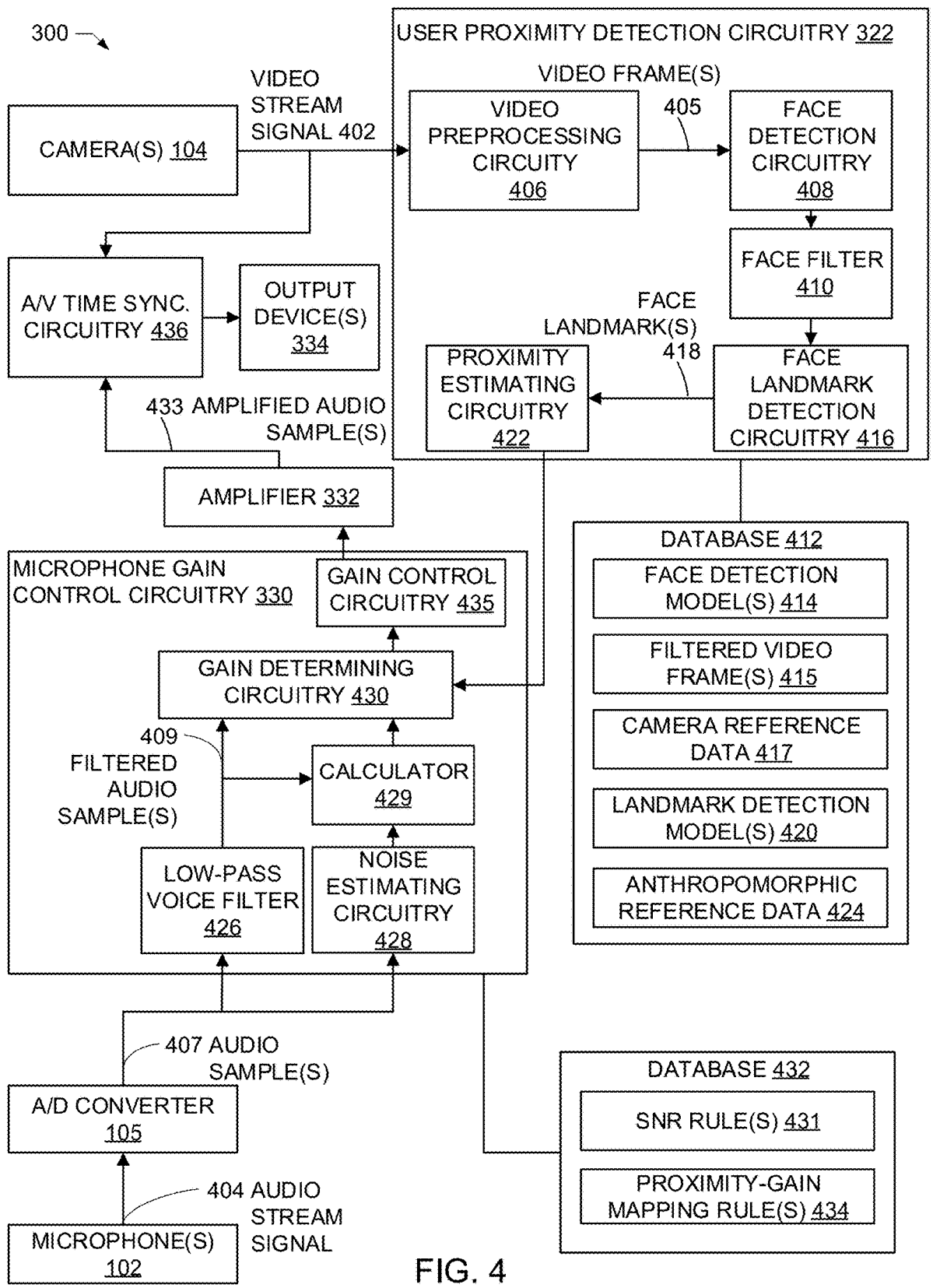
FIG. 4 is a block diagram of example implementation of the user proximity detection circuitry of FIG. 3 and an example implementation of the microphone gain control circuitry of FIG. 3.

FIG. 4 is a block diagram of an example implementation of the user proximity detection circuitry 322 and the microphone gain control circuitry 330 of FIG. 3. As mentioned above, the user proximity detection circuitry 322 is structured to identify (e.g., predict, estimate, recognize) a proximity of a speaker (e.g., the user 106 of FIG. 1) relative to the camera(s) 104 of the user device 301. In the example of FIG. 4, the user proximity detection circuitry 322 is implemented by one or more of the processor circuitry 310 of the user device 301, the processor circuitry 324 of the second user device 326, and/or cloud-based device(s) 328 (e.g., server(s), processors(s), and/or virtual machine(s) in the cloud 328 of FIG. 1 executing instructions). In some examples, some of the user proximity analysis is implemented by the user proximity detection circuitry 322 via a cloud-computing environment and one or more other parts of the analysis is implemented by the processor circuitry 310 of the user device 301 and/or the processor circuitry 324 of the user device 326 such as a wearable device. In some examples, the user proximity detection circuitry 322 is implemented by special purpose circuitry.

As also mentioned above, the microphone gain control circuitry 330 is structured to control gain applied to audio signal(s) capturing a voice of the speaker and output by the microphone(s) 102 of the user device 301. In the example of FIG. 4, the microphone gain control circuitry 330 is implemented by one or more of the processor circuitry 310 of the user device 301, the processor circuitry 324 of the second user device 326, and/or cloud-based device(s) 328 (e.g., server(s), processors(s), and/or virtual machine(s) in the cloud 328 of FIG. 1 executing instructions). In some examples, some of the gain control analysis is implemented by the microphone gain control circuitry 330 via a cloud-computing environment and one or more other parts of the analysis is implemented by the processor circuitry 310 of the user device 301 and/or the processor circuitry 324 of the user device 326 such as a wearable device. In some examples, the microphone gain control circuitry 330 is implemented by special purpose circuitry During a video conference using the user device 301 (e.g., during operation of the video conferencing application 314), the camera(s) 104 (e.g., video camera(s)) of the user device 100 of FIG. 1 generate image data in the form of a video stream or feed signal 402 (e.g., output by the video encoder 308 of FIG. 3). In the example of FIG. 4, the video stream signal 402 is provided to the user proximity detection circuitry 322 for analysis with respect to proximity of the user (i.e., the speaker) relative to the camera(s) 104. Also, during a video conference, the microphone(s) 102 of the user device 100 generate an audio stream signal 404 based on sound captured from the user of the user device 301 and/or the environment in which the user device 301 is located. As disclosed herein, the audio stream signal 404 is sampled and the samples are provided to the microphone gain control circuitry 330 for gain control.

In some examples, the video stream signal 402 is captured at a high resolution (e.g., 1280×720 pixels) and a high frame rate (e.g., 30 frames per second (FPS)) based on, for example, settings associated with the video conferencing application 314 and/or the video encoder 308 of FIG. 3. The example user proximity detection circuitry 322 of FIG. 4 includes video preprocessing circuitry 406. In the example of FIG. 4, the video preprocessing circuitry 406 down samples the video stream signal 402 output by the camera(s) 104. For example, the video preprocessing circuitry 406 reduces a sampling rate of the video stream signal 402 from, for instance, 30 FPS to 3 FPS. In some examples, the video preprocessing circuitry 406 samples the video stream signal 402 at a rate of 1-5 FPS. The video preprocessing circuitry 406 generates processed video frame(s) 405 as a result of the down sampling. In some examples, the video preprocessing circuitry 406 reduces or reshapes a resolution of the processed video frame(s) 405. For example, the video preprocessing circuitry 406 can decrease a resolution of the processed video frame(s) 405 (e.g., from 1280×720 pixels to 300×300 pixels). The down-sampling and/or resolution reduction performed by the video preprocessing circuitry 406 reduces consumption of computing resources during the user proximity analysis without sacrificing accuracy in detection of the proximity of the user to the camera(s) 104.

The example user proximity detection circuitry 322 includes face detection circuitry 408. In the example of FIG. 4, the face detection circuitry 408 detects face(s) (i.e., human face(s)) in the video frames 405. In the example of FIG. 4, the face detection circuitry 408 executes one or more neural network model(s) to detect face(s) in the respective video frame(s) 405. In particular, the example face detection circuitry 408 of FIG. 4 executes one or more face detection model(s) 414 to identify face(s) in the video frame(s) 405 and to output bounding boxes at the predicted location(s) of the face(s) in the video frame image data 405. As disclosed in connection with FIG. 5, the face detection model(s) 414 are generated as a result of neural network training.

In the example of FIG. 4, the face detection model(s) 414 are stored in a database 412. In some examples, the user proximity detection circuitry 322 includes the database 412. In other examples, the database 412 is located external to the user proximity detection circuitry 322 in a location accessible to the user proximity detection circuitry 322 as shown in FIG. 4.

As a result of the execution of the face detection model(s) 414, the face detection circuitry 408 detects or identifies faces in the respective video frame(s) 405 and locates the face(s) by creating a bounding box around each predicted face. In the example of FIG. 4, the outputs of the face detection model(s) 414 include corresponding confidence level(s) associated with the predicted face(s). In the example of FIG. 4, an area of a bounding box generated as a result of execution of the face detection model(s) 414 is substantially proportional to a size of the face detected in the video frame 405 and a proximity of the face to the camera(s) 104 of the user device 100.

The example user proximity detection circuitry 322 of FIG. 4 includes a face filter 410. The face filter 410 filters the bounding boxes associated with detected face(s) in the respective video frame(s) 405 based on the confidence level(s) assigned to the prediction(s) and a face detection threshold. The face detection threshold can define a confidence level or probability likelihood that a bounding box is associated with a human face captured in the image data. For example, the face detection threshold can define a minimum confidence level of 80% with respect to detecting face(s). The face detection threshold can be defined by user input(s) and stored in the database 412. In the example of FIG. 4, the face filter 410 compares the respective confidence level(s) associated with the bounding box(es) generated as a result of execution of the face detection model(s) 414 for the video frame(s) 405 to the face detection threshold. Based on the comparison, the face filter 410 identifies the bounding box(es) that satisfy the threshold and, thus, are likely to represent face(s) in the video frame(s) 405. In some examples, the face filter 410 removes the bounding box(es) in a video frame 405 that do not satisfy the face detection threshold from further analysis. In some examples, the face filter 410 identifies video frame(s) 405 that include bounding box(es) that satisfy the face detection threshold and removes (e.g., deletes) the video frame(s) 405 that do not include any bounding boxes that satisfy the threshold from further analysis.

In some examples, the face filter 410 identifies more than one bounding box in a video frame 405 that satisfies the face detection threshold. Thus, in such examples, more than one face is detected in the video frame 405. In these examples, the face filter 410 selects the bounding box with the largest area for further analysis. Put another way, when multiple bounding boxes in a video frame 405 satisfy the face detection threshold, the face filter 410 selects the bounding box with the largest area as most likely representative of a user who is speaking while interacting with the user device 100 (e.g., a primary speaker during the video conference) based on the size of the bounding box associated with the user's face relative to other faces in the image data. For instance, a face of a user who is closest to the camera(s) 104 and centered relative to the field of view of the camera(s) 104 may be associated with the largest bounding box in the video frame 405, thereby indicating that the user is most likely the speaker during the video conference because of his or her position relative to the camera(s) 104. The video frame(s) 405 including bounding box(es) that satisfy the face detection threshold are stored in the database 412 as filtered video frame(s) 415.

The example user proximity detection circuitry 322 of FIG. 4 includes face landmark detection circuitry 416. The example face landmark detection circuitry 416 detects face landmark(s) 418 in a face associated with a bounding box (e.g., the bounding box having the largest area) in a filtered video frame 415. The face landmarks 418 include key points on a face corresponding to features of the face (e.g., tip of a nose, inner corner of an eye) as detected in the image data (e.g., pixel data). In the example of FIG. 4, the face landmarks 418 identified by the face landmark detection circuitry 416 are used to determine attributes of a face of the user (i.e., the speaker), such as a size of the user's nose bridge, or a portion of the nose extending between the user's eyes.

In the example of FIG. 4, the face landmark detection circuitry 416 executes neural network model(s) to detect the face landmarks 418 in the video frame(s) 405. In particular, the example face landmark detection circuitry 416 of FIG. 4 executes landmark detection model(s) 420 stored in the database 412 to identify the face landmarks 418 in the video frame(s) 405. As disclosed in connection with FIG. 5, the landmark detection model(s) 420 are generated as a result of neural network training. As a result of the execution of the landmark detection model(s) 420, the face landmark detection circuitry 416 detects or identifies the face landmarks 418 in the respective video frame(s) 405. The landmark detection model(s) 420 can be generated to enable the face landmark detection circuitry 416 to detect particular face landmarks, such as a corner of the user's respective eyes proximate to the user's nose. Each face landmark 418 identified in a video frame 405 can be represented by a two-dimensional coordinate indicating the location of pixel in the video frame 405 representative of a key point on a face.

The example face landmark detection circuitry 416 of FIG. 4 also determines a distance (e.g., number of pixels) between the extracted face landmarks 418. The face landmark detection circuitry 416 can select two face landmarks 418 to determine a distance between the two the face landmarks 418. The face landmark detection circuitry 416 determines the two-dimensional distance between the two face landmarks 418 using the two-dimensional coordinates of the pixels associated with the respective locations of the face landmarks 418. In some examples, the face landmark detection circuitry 416 rounds the distance between the two face landmarks 418 to the nearest integer representing a number of pixels between the two points at which the landmarks 418 are located. In other examples, the face landmark detection circuitry 416 outputs a non-integer distance of pixels between the two face landmark points. As disclosed herein, the distance P between the two face landmarks 418 as determined by the face landmark detection circuitry 416 is used by the user proximity detection circuitry 322 to determine a distance between the face of the user (i.e., speaker) and the camera(s) 104.

The example user proximity detection circuitry 322 of FIG. 4 includes proximity estimating circuitry 422. The example proximity estimating circuitry 422 determines a proximity of the user associated with the facial landmarks 418 identified by the face landmark detection circuitry 416 relative to the camera(s) 104 associated with the user device 100. In the example of FIG. 4, the facial landmarks 418 identified by the face landmark detection circuitry 416 are used to estimate or determine a distance of the user from the camera(s) 104. For example, the face landmark detection circuitry 416 can identify the coordinates of pixels corresponding to the corners of the user's eyes proximate to the user's nose and calculate the distance P in pixels between the eye points to estimate a width of a nose bridge of the user. The proximity estimating circuitry 422 retrieves a reference value W that defines a known width of a human nose bridge from anthropomorphic reference data 424 stored in the database 412. The anthropomorphic reference data 424 can be defined by user input(s) include known measurements (e.g., widths) for facial features such as the nose bridge. The anthropomorphic reference data 424 can include facial feature measurement(s) based on, for example, average data collected for individuals based on gender, demographics, age, etc. Although in examples disclosed herein refer to using a width of the nose bridge in the proximity determination, other facial feature measurements (e.g., a forehead width) can be used.

The example proximity estimating circuitry 422 determines D, the distance between the face of the user (e.g., a user whose face is associated with the largest bounding box, the user 106 of FIG. 1, etc.) and the camera(s) 104, using Equation 1, below, wherein W is the reference facial feature measurement (e.g., a known nose bridge width), F is the focal length of the camera(s) 104 (stored as camera reference data 417 in the database 412 and defined by user input(s) for the camera(s) 104), and P is the measured distance between the landmarks 418 in pixels that represent a facial feature measurement for the user in the image data (e.g., a measured nose bridge width). Equation 1 can be based on triangular similarity.

$$D = \frac{(W \times F)}{P} \quad \text{(Equation 1)}$$

The distance D between the user and the camera(s) 104 represents the proximity of the user to the camera(s) 104. In the example of FIG. 4, the distance D of the user from the camera(s) 104 and the measured distance P between the face landmarks (e.g., representing a size of the user's nose bridge in pixels) have an inverse relationship. In particular, the smaller the distance between the user and camera(s) 104, the larger the size of the user's nose bridge as determined by the face landmark detection circuitry 416 based on the face landmarks 418 identified in the video frame(s) 405. As the distance between the user and the camera(s) 104 increases, a size of the nose bridge of the user as determined from the pixel image data decreases. For example, when the user is a distance of 30 centimeters (cm) from the camera(s) 104, the face landmark detection circuitry 416 may estimate the width of the user's nose bridge to be 83 pixels. As another example, when the user is a distance of 180 cm from the camera(s) 104, the face landmark detection circuitry 416 may estimate the width of the user's nose bridge size to be 18 pixels.

In the example of FIG. 4, the proximity estimating circuitry 422 determines the distance D of the user identified in the image data from the camera(s) 104 for each video frame 405 output by the video preprocessing circuitry 406. The proximity estimating circuitry 422 can generate a curve based on the proximity values D. In some examples, the proximity values can vary between the video frames 405 extracted from the video stream 402, which can indicate that the user has moved relative to the camera(s) 104. However, in some examples, the change in distance between the user and the camera(s) 104 is an anomaly due to, for example, a quick head movement of the user that is captured in the video frame(s) 405. For example, the proximity estimating circuitry 422 may determine a first distance $D_1$ between the user and the camera(s) 104 for a first video frame 405, a second distance $D_2$ for a second video frame 405, and a third distance $D_3$ for a third video frame 405, where the second distance $D_2$ is greater than the first distance $D_1$ and the third distance $D_3$. Such variations in the user proximity measurement between the video frames may represent an anomaly in the user proximity calculation as a result of, for instance, a quick head movement of the user, rather than reflecting actual changes in the distance of the user from the camera(s) 104, which can result in undesired effects when the user proximity values are used for audio gain control. In the example of FIG. 4, the proximity estimating circuitry 422 provides for smoothing of the proximity values to reduce and/or eliminate anomalies in the user proximity values between video frame(s) (e.g., adjacent video frames).

In the example of FIG. 4, the proximity estimating circuitry 422 performs a smoothing operation using Equations 2 and 3, below.

$$\mu[0]=x[0] \qquad \text{(Equation 2)}$$

$$\mu[n]=\alpha x[n]+(1-\alpha)\mu[n-1] \qquad \text{(Equation 3)}$$

In the above Equations 2 and 3, μ[n] represents a smoothed proximity value at a time step n and x[n] represents an actual proximity value at a time step n, where n=0 represents the initial time step. A filtering parameter α is a tunable parameter that may be adjusted between 0 and 1. For instance, the filter parameter can be assigned a value of α=0.2 to generate smooth proximity value curve.

Thus, the example user proximity detection circuitry 322 of FIG. 4 determines estimated, smoothed user proximity value(s) based on the video stream signal 402 output by the camera(s) 104. In the example of FIG. 4, the microphone gain control circuitry 330 analyzes the audio stream signal 404 to control gain applied to the audio stream signal 404. In particular, the microphone gain control circuitry 330 adjusts an amount of gain applied to the audio stream signal 404 based on analysis of the audio stream signal 404 and the user proximity estimation determined by the user proximity detection circuitry 322.

In the example of FIG. 4, the A/D converter 305 of the user device 100 samples the audio stream signal 404 and generates digital audio samples 407. The example microphone gain control circuitry 330 of FIG. 4 includes a digital low-pass voice filter 426. The example low-pass voice filter 426 provides filters the audio samples 407 to reduce effects of ambient noise in the environment in which the user device 100 is located and captured by the microphone(s) 102. The low-pass voice filter 426 can include, for example, a digital infinite impulse response (IIR) elliptic filter. In the example of FIG. 4, the low-pass voice filter 426 filters the audio samples 407 to remove noise that falls outside of a frequency range associated with a voice band of human speech. In some examples, the voice band is defined as frequencies of less than 6 kHz. The voice band frequencies can be defined by user input(s). As a result of the filtering, the low pass voice filter 426 outputs filtered audio samples 409 associated with a frequency band range from 0 to 6 kHz corresponding to the voice band.

The example microphone gain control circuitry 330 of FIG. 4 includes noise estimating circuitry 428. The example noise estimating circuitry 428 determines a level of ambient noise level in the audio samples 407. In particular, the noise estimating circuitry 428 analyzes the audio samples 407 to identify the audio sample(s) 407 that do not include frequencies associated with the voice band. The noise estimating circuitry 428 estimates the ambient noise level based on frequencies in the audio sample(s) 407 that do not include the voice band frequencies.

The example microphone gain control circuitry 330 of FIG. 4 includes a calculator 429. In the example of FIG. 4, the calculator 429 calculates a signal-to-noise ratio (SNR) based on (a) the filtered audio sample(s) 409 indicative of voice data and (b) the ambient noise level identified by the noise estimating circuitry 428. In the example of FIG. 4, the calculator 429 determines the SNR using Equation 4, below, where $RMS_{signal}$ is a root mean square of the filtered audio samples 409 including voice data and $RMS_{noise}$ is a root mean square of the audio samples 407 identified by the noise estimating circuitry 428 as not including voice activity.

$$SNR = 10 \log\left(\frac{RMS_{signal}^2}{RMS_{noise}^2}\right) \qquad \text{(Equation 4)}$$

The example microphone gain control circuitry 330 of FIG. 4 includes gain determining circuitry 430. The example gain determining circuitry 430 determines an amount of gain to apply to the voice band of the filtered audio sample(s) 409. The example gain determining circuitry 430 compares the SNR calculated by the calculator 429 to a SNR threshold level stored as SNR rule(s) 431. The SNR threshold level defines a SNR value that should be satisfied or exceeded to cause the amplifier 332 to apply gain to the voice band of the filtered audio sample(s) 409. For instance, in some examples, the audio samples 407 extracted from the audio stream signal 404 have a low SNR (e.g., less than 40 dB). In these examples, the audio samples 407 correspond to audio with a relatively high level of ambient noise. In such examples, the gain determining circuitry 430 determines, based on the SNR rule(s) 431, that the gain of the filtered audio sample(s) 409 should not be adjusted because applying the gain would increase the loudness of the ambient noise in the audio signal. In some such examples, the gain determining circuitry 430 determines, based on the SNR rule(s) 431, that a default gain value should be applied that does not (e.g., excessively) increase the loudness of the ambient noise in the audio.

In other examples, the audio samples 407 have a high SNR (e.g., greater than 40 dB) corresponding to a low level of ambient noise in the audio data. In these examples, the gain determining circuitry 430 determines, based on the SNR rule(s) 431, that the amplifier 332 should apply the gain to the filtered audio sample(s) 409 to adjust the volume level of the voice because of the low level of ambient noise. In the example of FIG. 4, the gain determining circuitry 430 instructs the amplifier 332 to apply a gain to the respective filtered audio samples 409 if the SNR associated with those filtered audio samples 409 is above the SNR threshold (e.g., the SNR is greater than 40 dB) based on the SNR rule(s) 431.

The SNR rules 431 can be defined by user input(s) and stored in a database 432. In some examples, the microphone gain control circuitry 330 includes the database 432. In other examples, the database 432 is located external to the microphone gain control circuitry 330 in a location accessible to the microphone gain control circuitry 330 as shown in FIG. 4. In some examples, the database 412, 432 are the same database.

In the example of FIG. 4, if the SNR threshold is satisfied, the gain determining circuitry 430 determines an amount of gain to be applied to the filtered audio sample(s) 409 based on the proximity of the user to the camera(s) 104 as determined by the proximity estimating circuitry 422 of the user proximity detection circuitry 322. In the example of FIG. 4, the proximity estimating circuitry 422 communicates the user proximity value(s) to the gain determining circuitry 430. The gain determining circuitry 430 determines the gain to be applied in view of the user proximity value(s) based on proximity-gain mapping rule(s) 434.

The proximity-gain mapping rule(s) 434 include reference data or mapping(s) (e.g., table(s)) that associate user proximity values with respect to a distance of user(s) from user device(s) (including accessories such as camera(s)) to gain values to be applied to audio signal(s) captured by microphone(s) associated with the device(s). In particular, the proximity-gain mapping rule(s) 434 define relationships between user proximities to device(s) and gain to enable a substantially uniform loudness of voice to be output despite differences in user proximity relative to the device(s). The proximity-gain mapping rule(s) 434 can be defined based on user input(s) and stored in the database 432. In some examples, the proximity-gain mapping rule(s) 434 are defined based on, for example, characteristics of the user device 100 (e.g., device type, signal processing hardware), characteristics of the microphone(s) 102, etc.

For example, the proximity-gain mapping rule(s) 434 can indicate if a distance between a user and a device is 40 cm, a gain value of 2 dB should be applied to the audio signal. As another example, the proximity-gain mapping rule(s) 434 can indicate that if the distance between the user and the device is 60 cm, a gain value of 6 dB should be applied to the audio signal. Thus, the proximity-gain mapping rule(s) 434 define that the amount of gain applied to the audio signal should increase as the distance between a user and the device and, thus, a microphone associated with the device, increases to enable the substantially uniform loudness of voice to be output despite the increased distance of the user from the microphone. In some examples, the proximity-gain mapping rule(s) 434 include a rule that if a distance between a user and a device is below a certain value, no gain should be applied to the audio signal to prevent unnecessary amplification of the voice band when the user is in close proximity to the device. The proximity-gain mapping rule(s) 434 can include a rule defining a maximum amount of gain to be applied such that if a distance between a user and a device is greater than a certain value, any further increase in distance of the user from the device does not result in any further increase in gain to avoid amplifying ambient noise rather than voice.

The gain determining circuitry 430 uses the proximity-gain mapping rule(s) 434 to determine a gain value (i.e., an amount of gain) to be applied to a filtered audio sample 409 in view of a proximity of a user to the camera(s) 104 as determined by the proximity estimating circuitry 422. In some examples, the gain determining circuitry 430 can perform interpolation (e.g., linear interpolation) to determine the gain value for the proximity value based on the proximity-gain mapping rule(s) 434 (e.g., the proximity gain mapping rule(s) 434 do not include the exact user proximity measurement). In some examples, the gain determining circuitry 430 applies an amplification factor to determine the gain value, where a value of the amplification factor as defined by the proximity-gain mapping rule(s) 434 increases with increased distance of the user from the camera(s) 104.

In the example of FIG. 4, the analysis of the video stream signal 402 by the user proximity detection circuitry 322 and the analysis of the audio samples 407 by the microphone gain control circuitry 330 occur substantially in real-time (e.g., in a near instantaneous manner (e.g., +/−1 second) recognizing there may be real-world delays for computing time, transmission, etc.) as the video data and the audio data are generated. Thus, the proximity value determined by the proximity estimating circuitry 422 corresponds in time to the filtered audio samples 409 passed to the gain determining circuitry 430 for gain control by the low-pass filter 426.

The example microphone gain control circuitry 330 of FIG. 4 includes gain control circuitry 435. The gain control circuitry 435 generates instructions that are transmitted to the amplifier 332 to cause the amplifier 332 apply the gain determined by the gain determining circuitry 430. In some examples, the amplifier 332 applies the gain to generate an amplified audio signal y[n] using Equation 5, below, where x[n] is the filtered audio sample 409 including the voice band output by the low-pass voice filter 426 and g[n] is the gain as determined by the gain determining circuitry 430 based on the proximity-gain mapping rule(s) 434.

$$y[n]=\text{Saturation}(g[n]*x[n]) \quad \text{(Equation 5)}$$

Amplified audio sample(s) 433 output by the amplifier 332 are transmitted to audio and video (A/V) time synchronization circuitry 436 of the user device 301. The A/V time synchronization circuitry 436 also receives the video stream signal 402 output by the video encoder 308 of FIG. 3. The A/V time synchronization circuitry 436 performs time synchronization of the amplified audio sample(s) 433 and the video stream signal 402. For example, the amplified audio sample(s) 433 and the video stream signal 402 can include time stamp data corresponding to a time at which the audio or video was captured. The A/V time synchronization circuitry 436 matches the time stamp(s) of the amplified audio sample(s) 433 to the time stamp(s) of the video stream signal 402 to create a time synchronized audio and video stream. The A/V time synchronization circuitry 436 outputs data including synchronized video data and amplified audio data for transmission to the video conference output device(s)

334 (e.g., based on communication protocols associated with, for instance, the video conferencing application 314). In the example of FIG. 4, the A/V time synchronization circuitry 436 is can be implemented by the processor circuitry 310 of the user device 301 of FIG. 3, the processor circuitry 324 of the second user device 326, and/or cloud-based device(s) 328 (e.g., server(s), processors(s), and/or virtual machine(s) in the cloud 328 of FIG. 3).

During a video conference (e.g., during operation of the video conferencing application 314), the camera(s) 104 of the user device 301 generate the video stream signal 402 over time and the microphone(s) 102 generate the audio stream signal 404 over time. The user proximity detection circuitry 322 analyzes new video data in the video stream signal 402 to determine if there have been any changes with respect to the proximity of the user (i.e., the speaker) to the camera(s). Also, the microphone gain control circuitry 330 to analyzes new audio data in the audio stream signal 404 over time. The microphone gain control circuitry 330 of FIGS. 3 and/or 4 dynamically responds to changes in user proximity to the camera(s) 104 by instructing the amplifier 332 to adjust gain in view of the proximity measurements received from the proximity estimating circuitry 422 over time. As a result, the example system 300 of FIGS. 3 and/or 4 provides for substantially consistent loudness of the voice output despite changes in user proximity to the camera(s) 104 and, by proxy, the microphone(s) 102.

The example user proximity detection circuitry 322 of FIGS. 3 and/or 4 also dynamically responds to changes in positions of two or more users, which can indicate a change in the primary speaker. For example, the face filter 410 analyzes the bounding boxes output by the face detection circuitry 408 for the respective video frames 405 over time. As the user move relative to the camera(s) 104 the size of the bounding box(es) and/or the confidence level(s) associated with the bounding box(es) may change. Thus, face selected by the face filter 410 for further analysis can change based on changes in the bounding box analysis. For example, a first user may be identified by the face filter 410 as associated with the largest bounding box in a first video frame. As such, the face landmark detection performed by the face landmark detection circuitry 416 and the proximity estimation performed by the proximity estimating circuitry 422 is based on image data for the first user in the first video frame. However, a second user may be identified by the face filter 410 as associated with the largest bounding box in a second video frame occurring after the first video frame. In such examples, the face landmark detection performed by the face landmark detection circuitry 416 and the proximity estimation performed by the proximity estimating circuitry 422 is based on image data for the second user in the second video frame. The gain determining circuitry 430 determines the gain to be applied based on the distance measurements about by the proximity estimating circuitry 422 for the particular user identified by the face filter 410. Thus, the example system 300 of FIG. 3 and/or 4 accounts for changes in user positions for two or more users, which can indicate changes in speaking roles, by continuously measuring user proximity and adjusting gain.

In some examples, the face detection circuitry 408 may not be able to detect any faces in the video frame 405 because of, for instance, low lighting the environment in which the user device 301 is located during the video conference. In such examples, the user proximity detection circuitry 322 refrains from outputting user proximity measurements. Instead, the microphone gain control circuitry 330 can instruct the amplifier 332 to apply a default gain value to the filtered audio sample(s) based on the SNR rule(s) 431 and/or the proximity-gain mapping rule(s) 434.

In other examples, the camera(s) 104 may be turned off during the video conference and, thus, the video stream signal 402 is not generated. Instead, the microphone gain control circuitry 330 can instruct the amplifier 332 to apply a default gain value to the filtered audio sample(s) based on the SNR rule(s) 431 and/or the proximity-gain mapping rule(s) 434.

Figure 5:
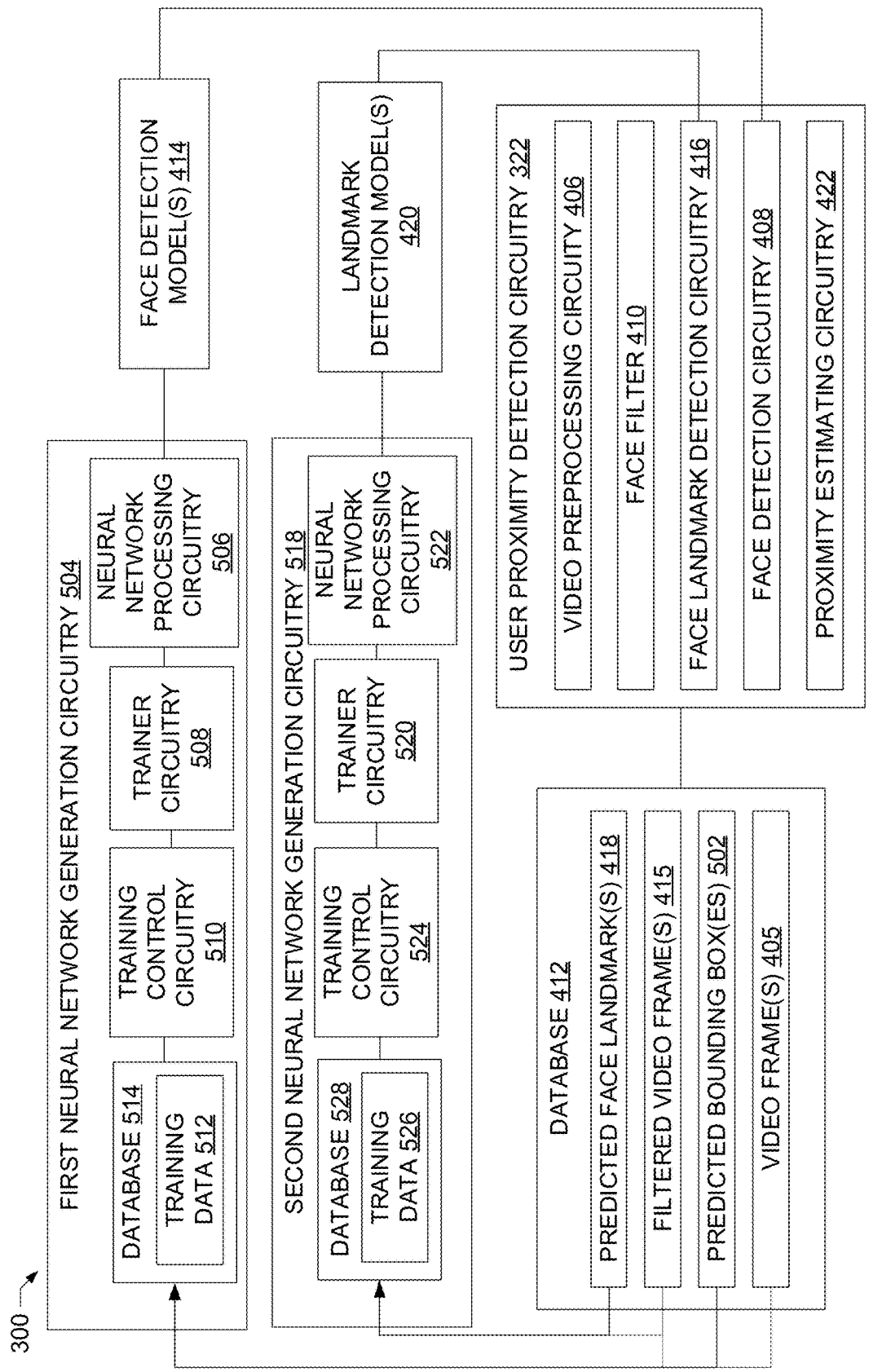
FIG. 5 is a block diagram of neural network generation circuitry for training neural network(s) to generate neural network model(s) for use by the example user proximity detection circuitry of FIGS. 3 and/or 4 during analysis of video frames in accordance with teachings of this disclosure.

FIG. 5 is a block diagram of an example implementation of one or more computing systems for generating the neural network model(s) 414, 420 used by the example user proximity detection circuitry 322 of FIGS. 3 and/or 4 to identify faces in the video frame(s) 405 and to identify facial landmarks in the face selected for further analysis by the face filter 410 of FIG. 4.

As disclosed in connection with FIG. 4, the face detection circuitry 408 analyzes the video frame(s) 405 to identify face(s) in the image data associated with the video frame(s) 405. In examples disclosed herein, machine learning is used to improve efficiency of the face detection circuitry 408 in detecting human faces in the video frames 405.

Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a neural network model such as a VGGNet based Face Detection and Face Point detection neural network is used. In general, machine learning models/architectures that are suitable to use in the example approaches disclosed herein will be CNN based neural networks (e.g., CNN-based VGGNet neural networks). However, other types of machine learning models could additionally or alternatively be used.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In some examples disclosed herein, ML/AI models are trained using stochastic gradient descent. However, any other training algorithm may additionally or alternatively be used. In examples disclosed herein, training is performed until a targeted accuracy level is reached (e.g., >95%). Training is performed using hyperparameters that control how the learning is performed (e.g., a learning rate, a number of layers to be used in the machine learning model, etc.). In other examples, pre-trained model(s) are used. In some examples re-training may be performed. Such re-training may be performed in response to, for example, poor face detection due to, for instance, low ambient lighting.

Training is performed using training data. In examples disclosed herein, the training data originates from previously collected image data of users including user faces, previously generated bounding boxes, image data including particular facial features such as eyes, nose, etc. Because supervised training is used, the training data is labeled. In some examples, the training data is pre-processed to provide for light balancing in the image data, image rotation, etc.

Once training is complete, the model is deployed for use as an executable construct that processes an input and provides an output based on the network of nodes and connections defined in the model. The model(s) are stored at one or more databases (e.g., the database 412 of FIG. 4). The model may then be executed by the face detection circuitry 408 and the face landmark detection circuitry 416 of the example user proximity detection circuitry 322 of FIG. 4.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Referring to FIG. 5, the example system 300 includes first neural network generation circuitry 504 to train a neural network to detect human faces in image data. The example first neural network generation circuitry 504 includes first neural network processing circuitry 506. In examples disclosed herein, the first neural network processing circuitry 506 implements a first neural network.

The example first neural network generation circuitry 504 of FIG. 5 includes first neural network trainer circuitry 508. The example first neural network trainer circuitry 508 of FIG. 5 performs training of the neural network implemented by the first neural network processing circuitry 506.

The example first neural network generation circuitry 504 of FIG. 5 includes a first training control circuitry 510. The example training control circuitry 510 instructs the first neural network trainer circuitry 508 to perform training of the neural network based on first training data 512. In the example of FIG. 5, the first training data 512 used by the first neural network trainer circuitry 508 to train the neural network is stored in a database 514.

In the example of FIG. 5, the first training data 512 can include previously generated image data including human faces. The previously generated image data can be collected by the camera(s) 104 associated with the user device(s) 100, 301 and/or different user devices. In some examples, previously generated video frame(s) 405 extracted from the video stream signal 402 by the video preprocessing circuitry 406 are used the first training data 512.

The first neural network trainer circuitry 508 trains the neural network implemented by the neural network processing circuitry 506 using the training data 512 to detect human faces in image data. One or more face detection model(s) 414 are generated as a result of the neural network training. The face detection model(s) 414 are stored in the database 412. In other examples, the face detection model(s) 414 can be stored in a different database. The databases 412, 514 may be the same storage device or different storage devices.

The face detection circuitry 408 of the example user proximity detection circuitry 322 of FIG. 4 executes the face detection model(s) 414. In particular, the face detection circuitry 408 executes the face detection model(s) 414 for each video frame 405. As a result of the execution of the face detection model(s) 414, the face detection circuitry 408 outputs bounding box(e)s 502 corresponding to detected face(s) in the respective video frames 405 and respective confidence level(s) associated with the bounding box(es). The predicted bounding boxes 502 are stored in the database 412. In some examples, the predicted bounding box(es) 502, the video frames 405, and/or the filtered video frame(s) 415 identified by the face filter 410 are used as the training data 512 to refine the face detection model(s) 414.

The example user proximity detection circuitry 322 of FIGS. 4 and 5 executes a second neural network to detect facial landmarks that serve as reference points for determining user proximity. The example system 300 includes second neural network generation circuitry 518 to train a neural network to detect facial landmark(s) (e.g., eyes, nose, forehead) in image data of a human face. The example second neural network generation circuitry 518 includes second neural network processing circuitry 522. In examples disclosed herein, the second neural network processing circuitry 522 implements a second neural network.

The example second neural network generation circuitry 518 of FIG. 5 includes a second neural network trainer circuitry 520. The example second neural network trainer circuitry 520 of FIG. 5 performs training of the neural network implemented by the second neural network processing circuitry 522.

The example second neural network generation circuitry 518 of FIG. 5 includes second training control circuitry 524. The example training control circuitry 524 instructs the second neural network trainer circuitry 520 to perform training of the neural network based on second training data 526. In the example of FIG. 5, the second training data 526 used by the second neural network trainer circuitry 520 to train the neural network is stored in a database 528.

In the example of FIG. 5, the second training data 526 can include image data of human faces, including image data of particular features of a face, such as eyes, nose, mouth, forehead, etc. The previously generated image data can be collected by the camera(s) 104 associated with the user device(s) 100, 301 and/or different user devices. In some examples, previously generated video frame(s) 405 extracted from the video stream signal 402 by the video preprocessing circuitry 406 are used as the second training data 526.

The second neural network trainer circuitry 520 trains the neural network implemented by the neural network processing circuitry 522 using the training data 526 to detect landmarks associated with the faces in the image data. One or more landmark detection model(s) 420 are generated as a result of the neural network training. The landmark detection model(s) 420 are stored in the database 412. In other examples, the landmark detection model(s) 420 can be stored in a different database. The databases 412, 528 may be the same storage device or different storage devices.

The face landmark detection circuitry 416 of the example user proximity detection circuitry 322 of FIG. 4 executes the landmark detection model(s) 420. In particular, the face landmark detection circuitry 416 executes the landmark detection model(s) 420 for each filtered video frame 415 identified by the face filter 410 as including a bounding box satisfying the face detection threshold. As a result of the execution of the landmark detection model(s) 420, the face landmark detection circuitry 416 outputs the predicted face landmarks 418 including pixel coordinates of the facial landmarks identified in the image data. The predicted facial landmarks 418 are stored in the database 412. In some examples, the predicted facial landmarks 418 are used as the training data 526 to refine the landmark detection model(s) 420.

In some examples, the user proximity detection circuitry 322 includes means for extracting video frame(s) from a video stream. For example, the means for extracting may be implemented by the video preprocessing circuitry 406. In some examples, the video preprocessing circuitry 406 may be implemented by machine executable instructions such as that implemented by at least block 903 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the video preprocessing circuitry 406 is implemented by other hardware logic circuitry, hardware implemented state machines, and/or any other combination of hardware, software, and/or firmware. For example, the video preprocessing circuitry 406 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the user proximity detection circuitry 322 includes means for detecting a face. For example, the face detecting means may be implemented by the face detection circuitry 408. In some examples, the face detection circuitry 408 may be implemented by machine executable instructions such as that implemented by at least blocks 904, 906, 908 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the face detection circuitry 408 is implemented by other hardware logic circuitry, hardware implemented state machines, and/or any other combination of hardware, software, and/or firmware. For example, the face detection circuitry 408 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the user proximity detection circuitry 322 includes means for filtering faces identified in image data. For example, the face filtering means may be implemented by the face filter 410. In some examples, the face filter 410 may be implemented by machine executable instructions such as that implemented by at least blocks 910, 912 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the face filter 410 is implemented by other hardware logic circuitry, hardware implemented state machines, and/or any other combination of hardware, software, and/or firmware. For example, the face filter 410 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the user proximity detection circuitry 322 includes means for identifying facial landmarks. For example, the facial landmark identifying means may be implemented by the face landmark detection circuitry 416. In some examples, the face landmark detection circuitry 416 may be implemented by machine executable instructions such as that implemented by at least block 914 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the face landmark detection circuitry 416 is implemented by other hardware logic circuitry, hardware implemented state machines, and/or any other combination of hardware, software, and/or firmware. For example, the face landmark detection circuitry 416 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the user proximity detection circuitry 322 includes means for determining a proximity of a user. For example, the means for determining proximity may be implemented by the proximity estimating circuitry 422. In some examples, the face landmark detection circuitry 416 may be implemented by machine executable instructions such as that implemented by at least blocks 916, 918 of FIG. 9 executed by processor circuitry, which may be implemented by the example processor circuitry 1112 of FIG. 11, the example processor circuitry 1200 of FIG. 12, and/or the example Field Programmable Gate Array (FPGA) circuitry 1300 of FIG. 13. In other examples, the proximity estimating circuitry 422 is implemented by other hardware logic circuitry, hardware implemented state machines, and/or any other combination of hardware, software, and/or firmware. For example, the proximity estimating circuitry 422 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the microphone gain control circuitry 330 includes means for filtering audio data. For example, the audio filtering means may be implemented by the low-pass voice filter 426. In some examples, the low-pass voice filter 426 may be implemented by machine executable instructions such as that implemented by at least block 1004 of FIG. 10 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the low-pass voice filter 426 is implemented by other hardware logic circuitry, hardware implemented state machines, and/or any other combination of hardware, software, and/or firmware. For example, the low-pass voice filter 426 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the microphone gain control circuitry 330 includes means for estimating noise. For example, the noise estimating means may be implemented by the noise estimating circuitry 428. In some examples, the noise estimating circuitry 428 may be implemented by machine executable instructions such as that implemented by at least block 1006 of FIG. 10 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the noise estimating circuitry 428 is implemented by other hardware logic circuitry, hardware implemented state machines, and/or any other combination of hardware, software, and/or firmware. For example, the noise estimating circuitry 428 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the microphone gain control circuitry 330 includes means for calculating a signal-to-noise-ratio. For example, the means for calculating may be implemented by the calculator 429. In some examples, the calculator 429 may be implemented by machine executable instructions such as that implemented by at least block 1008 of FIG. 10 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the calculator 429 is implemented by other hardware logic circuitry, hardware implemented state machines, and/or any other combination of hardware, software, and/or firmware. For example, the calculator 429 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the microphone gain control circuitry 330 includes means for determining gain. For example, the gain determining means may be implemented by the gain determining circuitry 430. In some examples, the gain determining circuitry 430 may be implemented by machine executable instructions such as that implemented by at least blocks 1010, 1012, 1014, 1016, 1018 of FIG. 10 executed by processor circuitry, which may be implemented by the example processor circuitry 1412 of FIG. 14, the example processor circuitry 1500 of FIG. 15, and/or the example Field Programmable Gate Array (FPGA) circuitry 1600 of FIG. 16. In other examples, the gain determining circuitry 430 is implemented by other hardware logic circuitry, hardware implemented state machines, and/or any other combination of hardware, software, and/or firmware. For example, the gain determining circuitry 430 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

While an example manner of implementing the user proximity detection circuitry 322 of FIG. 3 is illustrated in FIG. 4, one or more of the elements, processes, and/or devices illustrated in FIG. 4 may be combined, divided, re-arranged, omitted, eliminated, and/or implemented in any other way. Further, the example video preprocessing circuitry 406, the example face detection circuitry 408, the example face filter 410, the example face landmark detection circuitry 416, the example proximity estimating circuitry 422, and/or, more generally, the example user proximity detection circuitry 322 may be implemented by hardware, software, firmware, and/or any combination of hardware, software, and/or firmware. Thus, for example, any of the example video preprocessing circuitry 406, the example face detection circuitry 408, the example face filter 410, the example face landmark detection circuitry 416, the example proximity estimating circuitry 422, and/or, more generally, the example user proximity detection circuitry 322 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example video preprocessing circuitry 406, the example face detection circuitry 408, the example face filter 410, the example face landmark detection circuitry 416, and/or the example proximity estimating circuitry 422 is/are hereby expressly defined to include a non-transitory computer readable storage device or storage disk such as a memory, a digital versatile disk (DVD), a compact disk (CD), a Blu-ray disk, etc., including the software and/or firmware. Further still, the example user proximity detection circuitry 322 may include one or more elements, processes, and/or devices in addition to, or instead of, those illustrated in FIG. 4, and/or may include more than one of any or all of the illustrated elements, processes, and devices.

While an example manner of implementing microphone gain control circuitry 330 of FIG. 3 is illustrated in FIG. 4, one or more of the elements, processes, and/or devices illustrated in FIG. 4 may be combined, divided, re-arranged, omitted, eliminated, and/or implemented in any other way. Further, the example low pass voice filter 426, the example noise estimating circuitry 428, the example calculator 429, the example gain determining circuitry 430, the example gain control circuitry 435, and/or, more generally, the example microphone gain control circuitry 330 may be implemented by hardware, software, firmware, and/or any combination of hardware, software, and/or firmware. Thus, for example, any of the example low pass voice filter 426, the example noise estimating circuitry 428, the example calculator 429, the example gain determining circuitry 430, the example gain control circuitry 435 and/or, more generally, the example microphone gain control circuitry 330 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example low pass voice filter 426, the example noise estimating circuitry 428, the example calculator 429, the example gain determining circuitry 430, and/or the example gain control circuitry 435 is/are hereby expressly defined to include a non-transitory computer readable storage device or storage disk such as a memory, a digital versatile disk (DVD), a compact disk (CD), a Blu-ray disk, etc., including the software and/or firmware. Further still, the example microphone gain control circuitry 330 may include one or more elements, processes, and/or devices in addition to, or instead of, those illustrated in FIG. 4, and/or may include more than one of any or all of the illustrated elements, processes, and devices.

While an example manner of implementing the first neural network generation circuitry 504 is illustrated in FIG. 5, one or more of the elements, processes, and/or devices illustrated in FIG. 5 may be combined, divided, re-arranged, omitted, eliminated, and/or implemented in any other way. Further, the example training control circuitry 510, the example trainer circuitry 508, the example neural network processing circuitry 506, and/or, more generally, the example first neural network generation circuitry 504 may be implemented by hardware, software, firmware, and/or any combination of hardware, software, and/or firmware. Thus, for example, any of the example training control circuitry 510, the example trainer circuitry 508, the example neural network processing circuitry 506, and/or, more generally, the example first neural network generation circuitry 504 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example training control circuitry 510, the example trainer circuitry 508, and/or the example neural network processing circuitry 506 is/are hereby expressly defined to include a non-transitory computer readable storage device or storage disk such as a memory, a digital versatile disk (DVD), a compact disk (CD), a Blu-ray disk, etc., including the software and/or firmware. Further still, the example first neural network generation circuitry 504 may include one or more elements, processes, and/or devices in addition to, or instead of, those illustrated in FIG. 5, and/or may include more than one of any or all of the illustrated elements, processes, and devices.

While an example manner of implementing the second neural network generation circuitry 518 is illustrated in FIG. 5, one or more of the elements, processes, and/or devices illustrated in FIG. 5 may be combined, divided, re-arranged, omitted, eliminated, and/or implemented in any other way. Further, the example training control circuitry 524, the example trainer circuitry 520, the example neural network processing circuitry 522, and/or, more generally, the example second neural network generation circuitry 518 may be implemented by hardware, software, firmware, and/or any combination of hardware, software, and/or firmware. Thus, for example, any of the example training control circuitry 524, the example trainer circuitry 520, the example neural network processing circuitry 522, and/or, more generally, the example second neural network generation circuitry 518 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example training control circuitry 524, the example trainer circuitry 520, and/or the example neural network processing circuitry 522 is/are hereby expressly defined to include a non-transitory computer readable storage device or storage disk such as a memory, a digital versatile disk (DVD), a compact disk (CD), a Blu-ray disk, etc., including the software and/or firmware. Further still, the example second neural network generation circuitry 518 may include one or more elements, processes, and/or devices in addition to, or instead of, those illustrated in FIG. 5, and/or may include more than one of any or all of the illustrated elements, processes, and devices.

Figure 6:
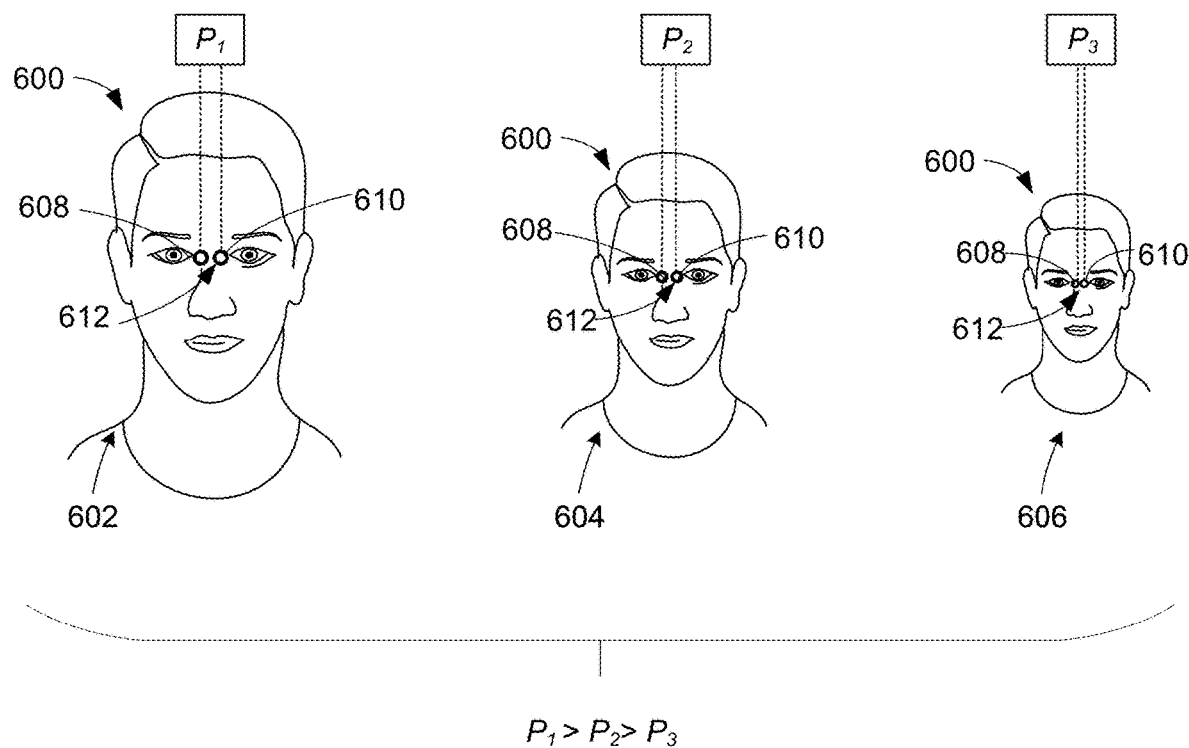
FIG. 6 includes examples images of a user and corresponding facial landmarks identified in the images.

FIG. 6 includes examples images of a user 600 (e.g., the user 106 of FIG. 1) and corresponding facial landmarks associated with the user 600 and identified in the images by the face landmark detection circuitry 416 of the example user proximity detection circuitry 322 of FIG. 4. In particular, FIG. 6 illustrates a first image 602 of the user 600, a second image 604 of the user 600, and a third image 606 of the user 600. The images 602, 604, 606 can be captured by the camera(s) 104 of the user device(s) 100, 301 of FIGS. 1 and/or 3.

In FIG. 6, the first image 602 captures the user 106 at a first distance from the camera(s) 104 (e.g., distance $X_1$ in FIG. 1). A first face landmark 608 and a second facial landmark 610 (e.g., the face landmarks 418) are identified in the first image 602 by the face landmark detection circuitry 416 of the example user proximity detection circuitry 322 of FIG. 4 (e.g., as a result of execution of the landmark detection model(s) 420). In the example of FIG. 6, the face landmarks 608, 610 represent inner eye points of the respective eyes of the user 600, or eye points proximate to a nose of the user 600. The first face landmark 608 includes a first pixel coordinate location corresponding to the location of the first face landmark 608 and the second face landmark 610 includes a second pixel coordinate location corresponding to the location of the second face landmark 610. The proximity estimating circuitry 422 of the example user proximity detection circuitry 322 of FIG. 4 determines a first distance $P_1$ in pixels between the first face landmark 608 and the second face landmark 610 (e.g., the inner eye points) based on the associated pixel coordinate values to estimate a width of a nose bridge 612 of the user 600.

In FIG. 6, the second image 604 captures the user 106 at a second distance from the camera(s) 104 greater than the first distance associated with the first image 602 (e.g., distance $X_2$ in FIG. 1). The face landmark detection circuitry 416 identifies the first and second face landmarks 608, 610 in the second image 604. The proximity estimating circuitry 422 determines a second distance $P_2$ in pixels between the first face landmark 608 and the second face landmark 610 (e.g., the inner eye points) based on the associated pixel coordinate values in the second image 604 to estimate a width of a nose bridge 612 of the user 600. In the example of FIG. 6, the estimated width of the nose bridge 612 of the user 600 as represented by the second distance $P_2$ of the second image 604 is less than the width of the nose bridge 612 as represented by the first distance $P_1$ determined using the first image 602. Thus, as a result of the increased distance between the user 600 and the camera(s) 104 in the second image 604, the estimated width of the nose bridge 612 of the user 612 is less in the second image 604 than the first image 602.

The third image 606 of FIG. 6 captures the user 106 at a third distance from the camera(s) 104 greater than the first distance associated with the first image 602 and the second distance associated with the second image 604. The face landmark detection circuitry 416 identifies the first and second face landmarks 608, 610 in the third image 606. The proximity estimating circuitry 422 determines a third distance $P_3$ in pixels between the first face landmark 608 and the second face landmark 610 (e.g., the inner eye points) based on the associated pixel coordinate values in the third image 606 to estimate a width of a nose bridge 612 of the user 600. In the example of FIG. 6, the estimated width of the nose bridge 612 of the user 600 as represented by the distance $P_3$ of the third image 606 is less than the widths of the nose bridge 612 as represented by the first distance $P_1$ determined using the first image 602 and the second distance $P_2$ determined using the second image 604. Thus, as a result of the increased distance between the user 600 and the camera(s) 104 in the third image 604, the estimated width of the nose bridge 612 of the user 600 is less in the third image 606 than the first image 600 and the second image 604. As disclosed in connection with FIGS. 3-5, the width of the nose bridge 612 (or other facial landmarks) is used by the proximity estimating circuitry 422 to determine a distance of the user 600 from the camera(s) 104. The resulting distance calculated by the proximity estimating circuitry 422 is used by the microphone gain control circuitry 330 of FIG. 3 to control audio gain.

Figure 7:
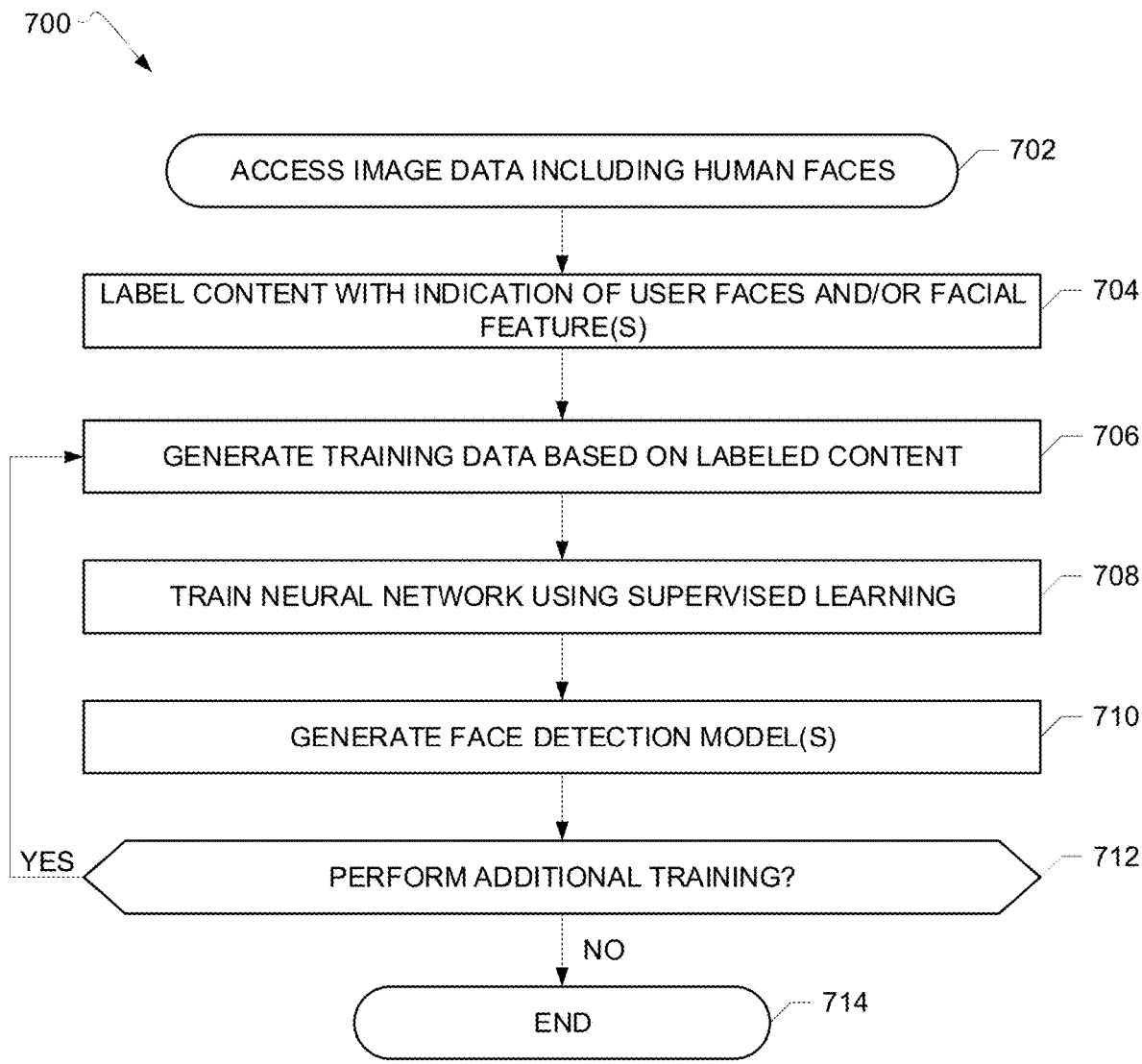
FIG. 7 is a flowchart representative of example machine readable instructions and/or operations that may be executed and/or instantiated by example processor circuitry to train a neural network to identify faces in image data.
Figure 8:
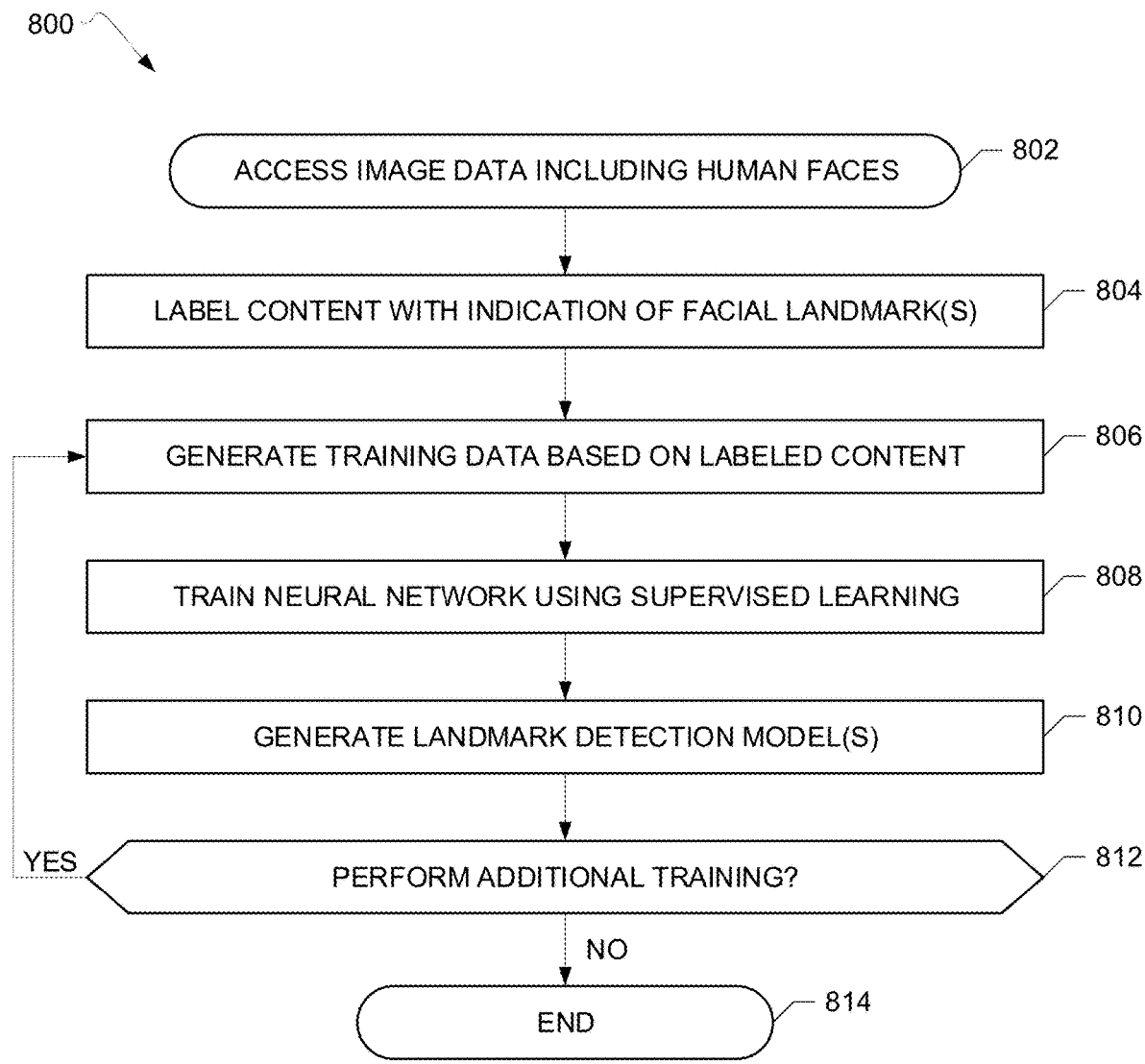
FIG. 8 is a flowchart representative of example machine readable instructions and/or operations that may be executed and/or instantiated by example processor circuitry to train a neural network to identify facial landmarks in image data.
Figure 9:
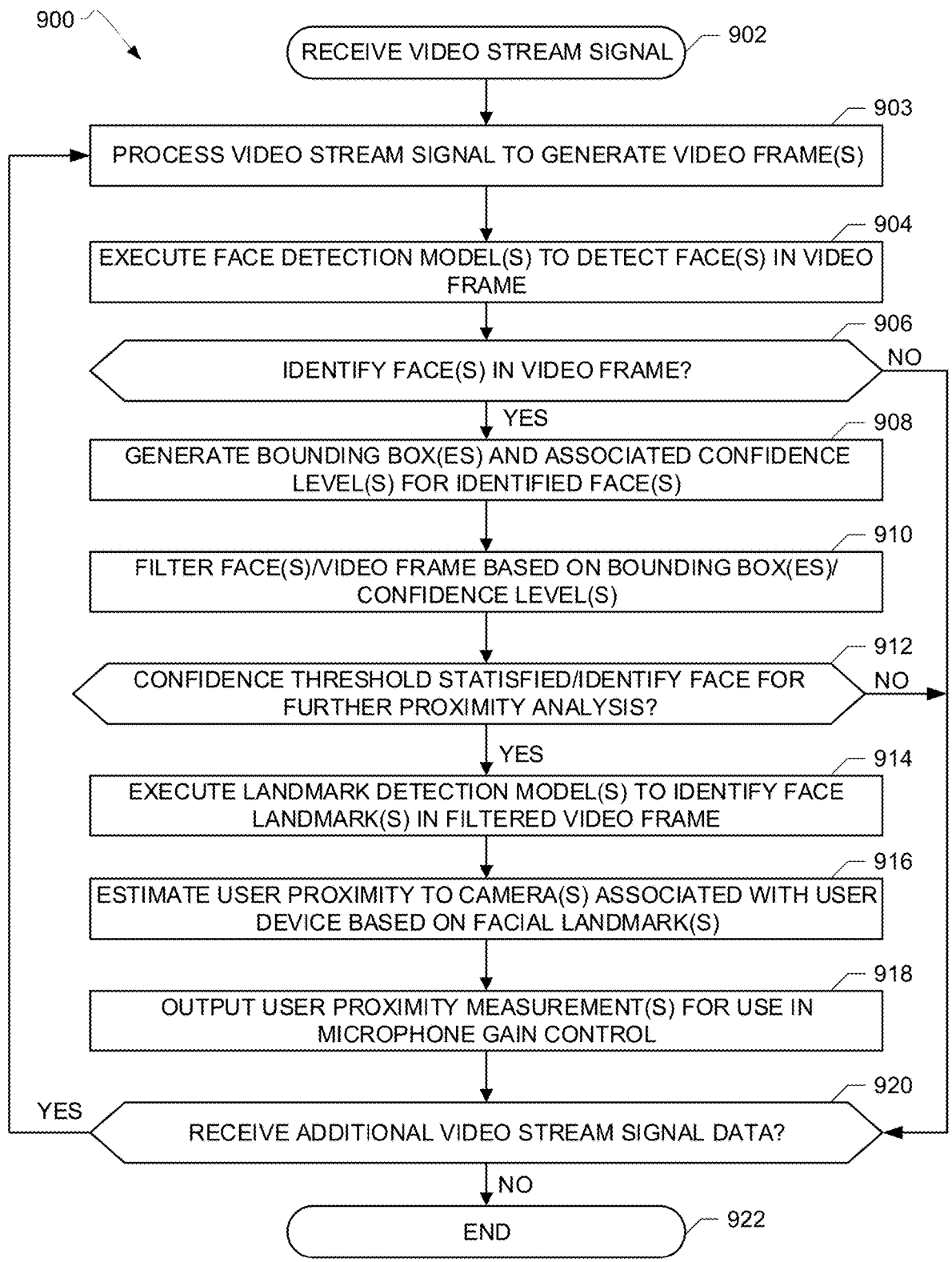
FIG. 9 is a flowchart representative of example machine readable instructions and/or operations that may be executed and/or instantiated by example processor circuitry to implement the user proximity detection circuitry of FIGS. 3 and/or 4.
Figure 10:
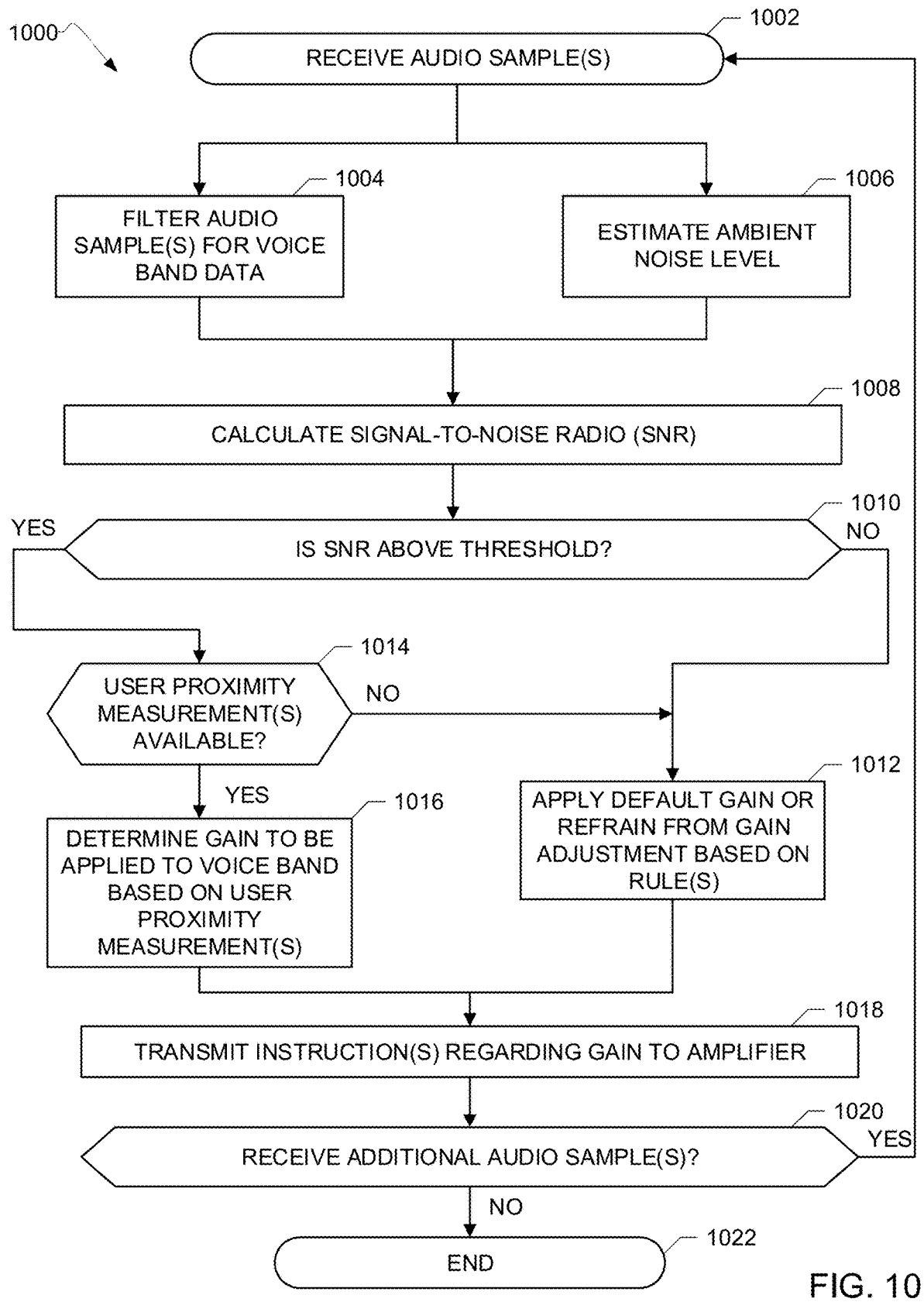
FIG. 10 is a flowchart representative of example machine readable instructions and/or operations that may be executed and/or instantiated by example processor circuitry to implement the microphone gain control circuitry of FIGS. 3 and/or 4.

A flowchart representative of example hardware logic circuitry, machine readable instructions, hardware implemented state machines, and/or any combination thereof for implementing the first neural network generation circuitry 504 of FIG. 5 is shown in FIG. 7. A flowchart representative of example hardware logic circuitry, machine readable instructions, hardware implemented state machines, and/or any combination thereof for implementing the second neural network generation circuitry 518 of FIG. 5 is shown in FIG. 8. A flowchart representative of example hardware logic circuitry, machine readable instructions, hardware implemented state machines, and/or any combination thereof for implementing the user proximity detection circuitry 322 of FIGS. 3 and/or 4 is shown in FIG. 9. A flowchart representative of example hardware logic circuitry, machine readable instructions, hardware implemented state machines, and/or any combination thereof for implementing the microphone gain control circuitry 330 of FIGS. 3 and/or 4 is shown in FIG. 10. The machine readable instructions may be one or more executable programs or portion(s) of an executable program for execution by processor circuitry, such as the processor circuitry 1112, 1412, 1712, 1812 shown in the example processor platform(s) 1100, 1400, 1700, 1800 discussed below in connection with FIGS. 11, 14, 17, and 18. The program(s) may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program(s) and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program(s) are described with reference to the flowcharts illustrated in FIGS. 7-10, many other methods of implementing the example user proximity detection circuitry 322, the example microphone gain control circuitry 330, the example first neural network generation circuitry 504, and/or the example second neural network generation circuitry 518 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 7-10 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 7 is a flowchart representative of example machine readable instructions and/or example operations 700 that may be executed and/or instantiated by processor circuitry to train a neural network to identify human faces in image data. The example instructions 700 of FIG. 7, when executed by the first neural network generation circuitry 504 of FIG. 5, result in a neural network and/or a model thereof (e.g., the face detection model(s) 414), that can be distributed to other computing systems, such as the face detection circuitry 408 of the example user proximity detection circuitry 322 of FIG. 4.

The machine readable instructions and/or operations 700 of FIG. 7 begin at block 702, at which the training control circuitry 510 of the example first neural network generation circuitry 504 accesses image data including human faces. The image data can include the video frame(s) 405, the filtered video frame(s) 415, and/or the predicted bounding box(es) stored in the database 412 associated with the user proximity detection circuitry 322 as part of feedback training.

At block 704, the training control circuitry 510 labels the data with respect to human faces in the image data and/or facial features (e.g., nose, mouth, eyes). At block 706, the example training control circuitry 510 generates the training data 512 based on the labeled image data.

At block 708, the example training control circuitry 510 instructs the neural network trainer circuitry 508 to perform training of the neural network processing circuitry 506 using the training data 512. In the example of FIG. 7, the training is based on supervised learning. As a result of the training, the face detection model(s) 414 are generated at block 710. Based on the face detection model(s) 414, the neural network is trained to identify human faces in image data and to generate bounding boxes for the respective faces with associated confidence levels for detection of the faces. The face detection model(s) 414 can be stored in the database 412 for access by the face detection circuitry 408 of the example user proximity detection circuitry 322 of FIG. 4. The example instructions 700 of FIG. 7 end when no additional training (e.g., retraining) is to be performed (blocks 712, 714).

FIG. 8 is a flowchart representative of example machine readable instructions and/or example operations 800 that may be executed and/or instantiated by processor circuitry to train a neural network to identify facial landmarks in image data. The example instructions 800 of FIG. 8, when executed by the second neural network generation circuitry 518 of FIG. 5, result in a neural network and/or a model thereof (e.g., the landmark detection model(s) 420), that can be distributed to other computing systems, such as the face landmark detection circuitry 416 of the example user proximity detection circuitry 322 of FIG. 4.

The machine readable instructions and/or operations 800 of FIG. 8 begin at block 802, at which the training control circuitry 524 of the example second neural network generation circuitry 518 accesses image data including human faces. The image data can include the video frame(s) 405, the filtered video frame(s) 415, and/or the predicted face landmark(s) 418 stored in the database 412 associated with the user proximity detection circuitry 322 as part of feedback training.

At block 804, the training control circuitry 510 labels the data with respect to facial landmark(s) (e.g., an inner corner of a user's eye proximate to the user's nose) associated with human faces in the image data. For example, the training control circuitry 510 labels the pixels (e.g., pixel coordinates) in the image data associated with the facial landmark(s). At block 806, the example training control circuitry 510 generates the training data 526 based on the labeled image data.

At block 808, the example training control circuitry 524 instructs the neural network trainer circuitry 520 to perform training of the neural network processing circuitry 522 using the training data 526. In the example of FIG. 8, the training is based on supervised learning. As a result of the training, the landmark detection model(s) 420 are generated at block 810. Based on the landmark detection model(s) 420, the neural network is trained to identify facial landmark(s) associated with a human face in image data and to output pixel coordinates of the location of the facial landmark(s). The landmark detection model(s) 420 can be stored in the database 412 for access by the face landmark detection circuitry 416 of the example user proximity detection circuitry 322 of FIG. 4. The example instructions 800 of FIG. 8 end when no additional training (e.g., retraining) is to be performed (blocks 812, 814).

FIG. 9 is a flowchart representative of example machine readable instructions and/or example operations 900 that may be executed and/or instantiated by processor circuitry to determine a proximity of a user (e.g., the user 106) relative to cameras (e.g., the camera(s) 104) of a user device (e.g., the user device 100, 301 of FIGS. 1, 3). The machine readable instructions and/or operations 900 of FIG. 9 begin at block 902, at which the user proximity detection circuitry 322 receives the video stream signal 402 generated by the camera(s) 104. At block 903, the video preprocessing circuitry 406 of the example user proximity detection circuitry 322 processes the video stream signal 402. For example, the video preprocessing circuitry 406 can reduce a sampling rate (e.g., downsample) the video stream signal 402 to a lower frame rate and/or reshape the video stream signal 402 to a lower resolution to generate the video frames 405.

At block 904, the face detection circuitry 408 of the user proximity detection circuitry 322 executes the face detection model(s) 414 to detect face(s) in one of the video frames 405. At block 906, if the face detection circuitry 408 does not detect any face(s) in the video frame because of, for example, low ambient light, the instructions of FIG. 9 continue to block 920 to determine if additional video stream signal data has been received.

If the face detection circuitry 408 identifies face(s) in the video frame, then at block 908, the face detection circuitry 408 generates bounding box(es) including associated confidence level(s) for the prediction of the face(s) in the video frame detected as a result of the neural network analysis. An area of the bounding box can be proportional to the size of the face in the image data and, thus, a proximity of the user to the camera(s) 104.

At block 910, the face filter 410 of the user proximity detection circuitry 322 analyzes the confidence level(s) associated with the bounding box(es) to identify face(s) that satisfy a confidence level threshold for prediction of a human face. In examples in which more than one face is identified that satisfies the confidence level threshold, the face filter 410 analyzes the size of the bounding boxes associated with the faces to select the face associated with the bounding box having the largest area for further analysis. The face filter 410 output a filtered video frame including the face selected for further analysis (e.g., a face associated with a primary speaker).

If, at block 912, none of the face(s) identified in the video frame satisfy the confidence threshold, the instructions of FIG. 9 continue to block 920 to determine if additional video stream signal data has been received.

At block 914, the face landmark detection circuitry 416 of the user proximity detection circuitry 322 executes the landmark detection model(s) 420 to identify face landmark(s) in the face identified in filtered video frame. The face landmark(s) can include, for example, a corner or point of each of the user's eyes proximate to the user's nose. As a result of execution of the landmark detection model(s) 420, the face landmark detection circuitry 416 outputs pixel coordinate data including the locations of the face landmark(s) in pixels. The face landmark detection circuitry 416 can determine a distance between two face landmarks. For example, the face landmark detection circuitry 416 can determine a distance in pixels between two eye points, which can represent a width of the user's nose bridge in the image data.

At block 916, the proximity estimating circuitry 422 of the user proximity detection circuitry 322 determines the user proximity relative to the camera(s) 104 associated with the user device 100, 301 based on the coordinate data associated with the face landmark(s). For example, the proximity estimating circuitry 422 solves a triangular similarity equation to determine a distance of the user from the camera(s) 104 based on the measured distance between the face landmarks identified by the face landmark detection circuitry 416 (e.g., a distance between two eye points), known facial feature reference data (e.g., the anthropomorphic reference data 424, including, for example, reference nose bridge widths), and camera reference data 417 (e.g., focal length). At block 918, the proximity estimating circuitry 422 outputs the user proximity measurement(s) for use in microphone gain control by the microphone gain control circuitry 330 of FIGS. 3 and 4. The example instructions 900 of FIG. 9 end at blocks 920, 922 when no additional video stream signal data is received.

FIG. 10 is a flowchart representative of example machine readable instructions and/or example operations 1000 that may be executed and/or instantiated by processor circuitry to determine control an amount of gain applied to sound captured by microphone(s) (e.g., the microphone(s) 102) based on a proximity of a user to camera(s) (e.g., the camera(s) 104) associated with a user device (e.g., the user device 100, 301). The machine readable instructions and/or operations 1000 of FIG. 10 begin at block 1002, at which the microphone gain control circuitry 330 receives audio sample(s) 407 including sound captured by the microphone(s).

At block 1004, the low-pass voice filter 426 of the microphone gain control circuitry 330 filters the audio sample(s) 407 to remove ambient noise data. For example, the low-pass voice filter 426 can apply a filter to permit frequencies in the audio sample(s) 407 associated with a voice band (e.g., frequencies of less than 6 kHz) to pass. As a result, the low-pass filter 426 outputs filtered audio sample(s) 409.

At block 1006, the noise estimating circuitry 428 of the microphone gain control circuitry 330 estimates an ambient noise level of the audio sample(s) by analyzing the audio samples 407 that do not include voice band activity.

At block 1008, the calculator 429 of the microphone gain control circuitry 330 calculates the signal-to-noise ratio (SNR) based on the filtered audio samples 409 including the voice band frequencies and the ambient noise level of the audio samples 407 identified by the noise estimating circuitry 428.

At block 1010, the gain determining circuitry 430 of the example microphone gain control circuitry 330 compares the SNR calculated by the calculator 429 to an SNR threshold defined by the SNR rule(s) 431. At block 1012, if the gain determining circuitry 430 determines that the SNR calculated by the calculator 429 does not satisfy the SNR threshold (e.g., is below the SNR threshold, thereby indicating a high level of ambient noise in the environment), then the gain determining circuitry 430 determines that the amplifier should refrain applying gain to the voice band of the filtered audio sample(s) 409 and/or to apply a default gain value based on the proximity-gain mapping rule(s) 434. Thus, the gain determining circuitry 430 prevents ambient noise from being unduly amplified.

At block 1014, if the gain determining circuitry 430 determines that SNR calculated by the calculator 429 satisfies the SNR threshold, the gain determining circuitry 430 accesses the user proximity measurement(s) generated by the proximity estimating circuitry 422 of the user proximity detection circuitry 322 (e.g., at block 916 of FIG. 9). As disclosed herein, the user proximity measurement(s) indicate a distance of the user (i.e., the primary speaker in a video conference) from the camera(s) 104 associated with the user device 100, 301. If the gain determining circuitry 430 determines that the user proximity measurement(s) have not been generated, the instructions of FIG. 10 proceed to block 1012 to apply default gain rule(s). For example, if the face detection circuitry 408 of the user proximity detection circuitry 322 is unable to identify face(s) in the video frame(s) 405 because of low ambient lighting (e.g., block 906 of FIG. 9), then the gain determining circuitry 430 determine that a default gain should be applied to the voice band of the audio data and/or that the amplifier 332 should refrain from applying gain based on the proximity-gain mapping rule(s) 434.

If the user proximity measurement(s) are available, then at block 1016, the gain determining circuitry 430 determines an amount of gain to be applied to the voice band of the filtered audio sample(s) 409 based on the proximity-gain mapping rule(s) 434. The proximity-gain mapping rule(s) 434 can include mappings of user proximity measurements to gain values to be applied. In some examples, the proximity-gain mapping rule(s) 434 define a minimum proximity measurement for which gain is to be applied (e.g., so as not unnecessarily amplify the voice band when the user is proximate to the camera(s) 104). In some examples, the proximity-gain mapping rule(s) 434 define a maximum amount of gain to be applied such that further increases in a distance of the user from the camera(s) 104 does not result in increased gain values (e.g., to avoid amplifying ambient noise).

At block 1018, the gain control circuitry 435 transmits instructions to the amplifier 332 of the user device 100, 301 regarding the amount of gain to be applied to the voice band. In some examples, the instructions cause the amplifier 332 to output amplified audio sample(s) 433 based on the instructions. The example instructions 1000 of FIG. 10 end at blocks 1020, 1022 when no additional audio sample(s) are received.

Figure 11:
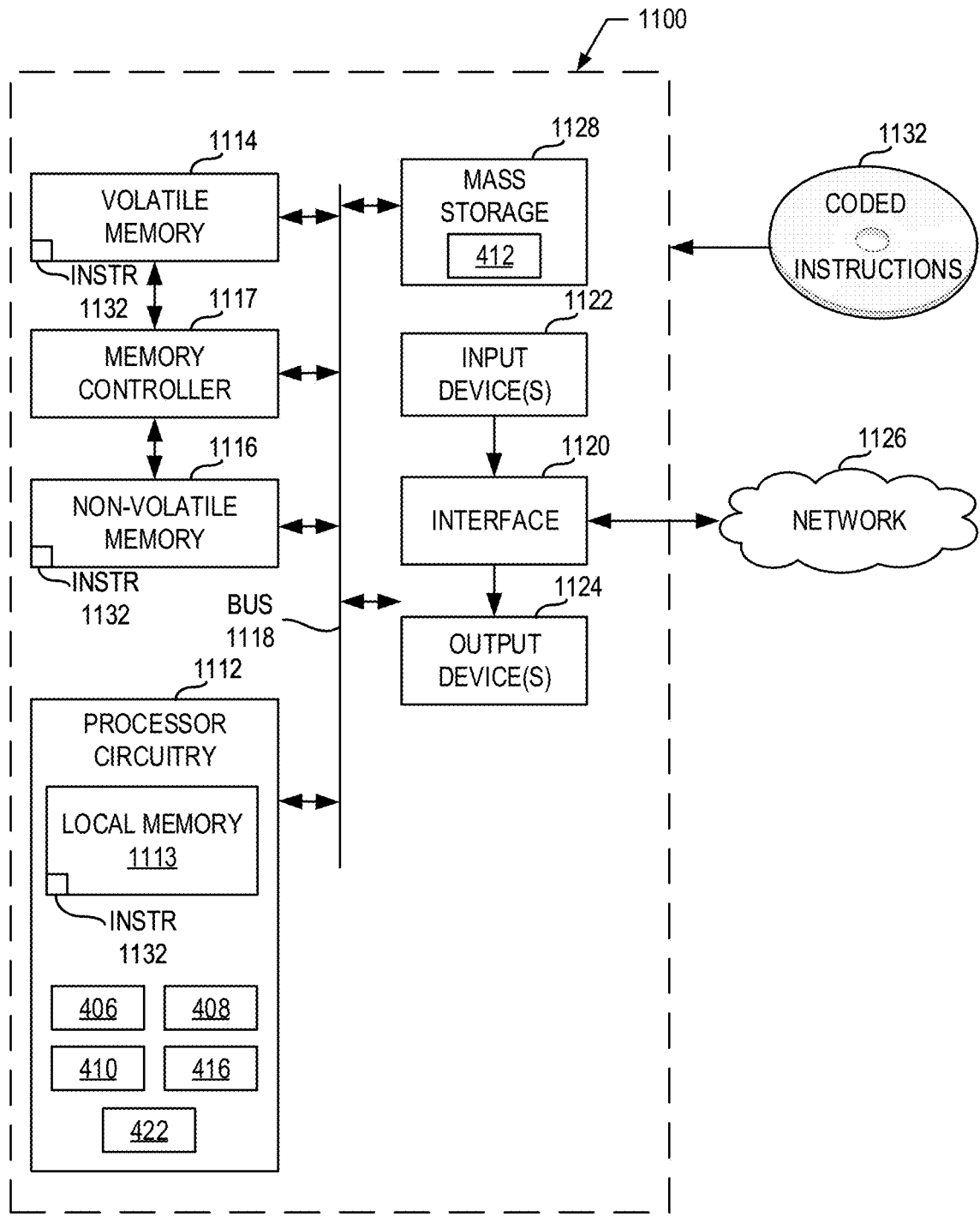
FIG. 11 is a block diagram of an example processor platform including processor circuitry structured to execute and/or instantiate the example machine readable instructions of FIG. 9 to implement the user proximity detection circuitry of FIGS. 3 and/or 4.

FIG. 11 is a block diagram of an example processor platform 1100 structured to execute and/or instantiate the machine readable instructions and/or operations of FIG. 9 to implement the user proximity detection circuitry 322 of FIGS. 3 and/or 4. The processor platform 1100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1100 of the illustrated example includes processor circuitry 1112. The processor circuitry 1112 of the illustrated example is hardware. For example, the processor circuitry 1112 can be implemented by one or more integrated circuits, logic circuits, FPGAs microprocessors, CPUs, GPUs, DSPs, and/or microcontrollers from any desired family or manufacturer. The processor circuitry 1112 may be implemented by one or more semiconductor based (e.g., silicon based) devices. In this example, the processor circuitry 1112 implements the example video preprocessing circuitry 406, the example face detection circuitry 408, the example face filter 410, the example face landmark detection circuitry 416, and the example proximity estimating circuitry 422.

The processor circuitry 1112 of the illustrated example includes a local memory 1113 (e.g., a cache, registers, etc.). The processor circuitry 1112 of the illustrated example is in communication with a main memory including a volatile memory 1114 and a non-volatile memory 1116 by a bus 1118. The volatile memory 1114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1116 may be implemented by flash memory and/or any other desired type of memory device. Access to the main memory 1114, 1116 of the illustrated example is controlled by a memory controller 1117.

The processor platform 1100 of the illustrated example also includes interface circuitry 1120. The interface circuitry 1120 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1122 are connected to the interface circuitry 1120. The input device(s) 1122 permit(s) a user to enter data and/or commands into the processor circuitry 1112. The input device(s) 1122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1124 are also connected to the interface circuitry 1120 of the illustrated example. The output devices 1124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1120 of the illustrated example, thus, typically includes a graphics driver card, a graphics driver chip, and/or graphics processor circuitry such as a GPU.

The interface circuitry 1120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1100 of the illustrated example also includes one or more mass storage devices 1128 to store software and/or data. Examples of such mass storage devices 1128 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1132, which may be implemented by the machine readable instructions of FIG. 9, may be stored in the mass storage device 1128, in the volatile memory 1114, in the non-volatile memory 1116, and/or on a removable non-transitory computer readable storage medium such as a CD or DVD.

Figure 12:
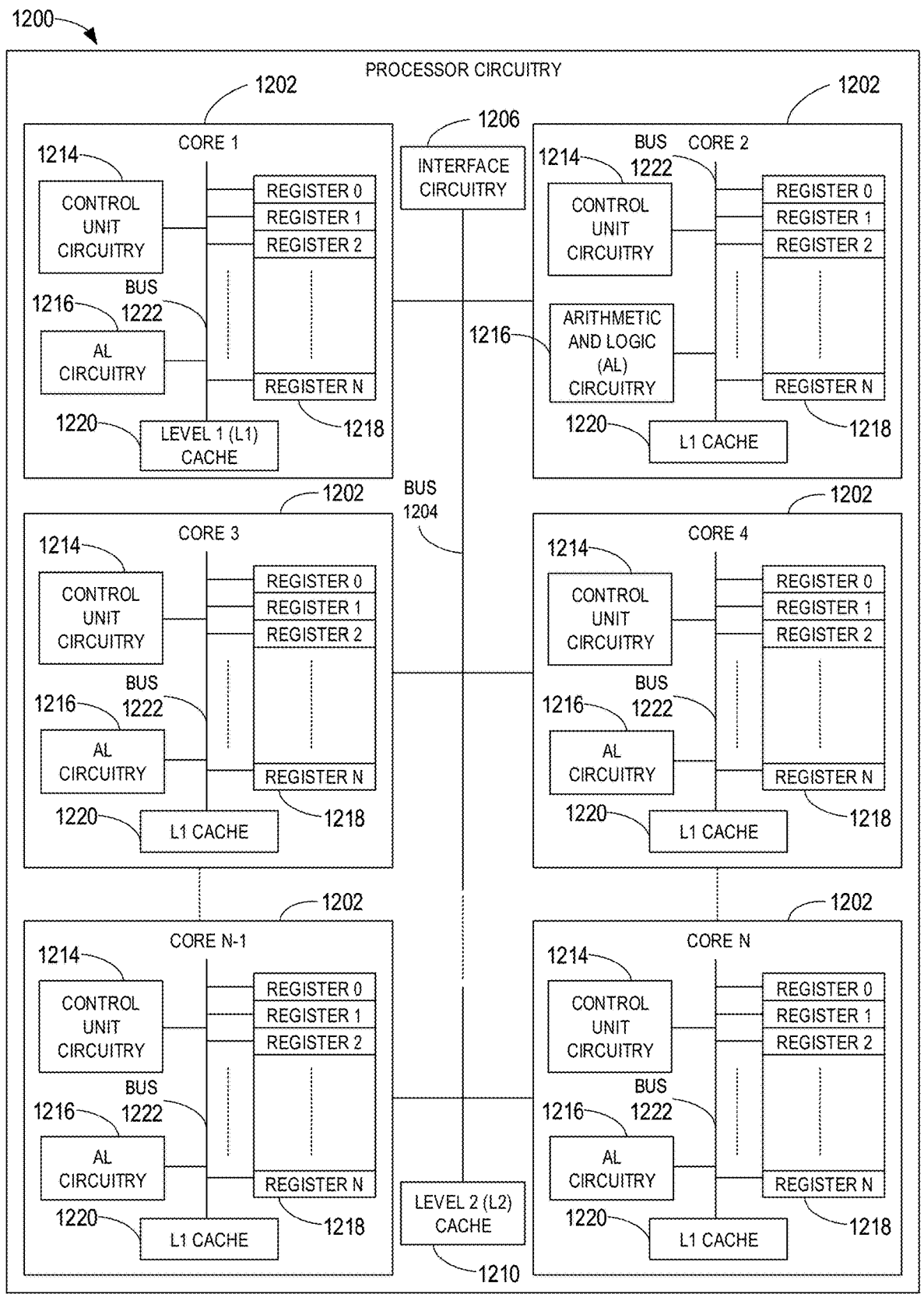
FIG. 12 is a block diagram of an example implementation of the processor circuitry of FIG. 11.

FIG. 12 is a block diagram of an example implementation of the processor circuitry 1112 of FIG. 11. In this example, the processor circuitry 1112 of FIG. 11 is implemented by a microprocessor 1200. For example, the microprocessor 1200 may implement multi-core hardware circuitry such as a CPU, a DSP, a GPU, an XPU, etc. Although it may include any number of example cores 1202 (e.g., 1 core), the microprocessor 1200 of this example is a multi-core semiconductor device including N cores. The cores 1202 of the microprocessor 1200 may operate independently or may cooperate to execute machine readable instructions. For example, machine code corresponding to a firmware program, an embedded software program, or a software program may be executed by one of the cores 1202 or may be executed by multiple ones of the cores 1202 at the same or different times. In some examples, the machine code corresponding to the firmware program, the embedded software program, or the software program is split into threads and executed in parallel by two or more of the cores 1202. The software program may correspond to a portion or all of the machine readable instructions and/or operations represented by the flowchart of FIG. 9.

The cores 1202 may communicate by an example bus 1204. In some examples, the bus 1204 may implement a communication bus to effectuate communication associated with one(s) of the cores 1202. For example, the bus 1204 may implement at least one of an Inter-Integrated Circuit (I2C) bus, a Serial Peripheral Interface (SPI) bus, a PCI bus, or a PCIe bus. Additionally or alternatively, the bus 1204 may implement any other type of computing or electrical bus. The cores 1202 may obtain data, instructions, and/or signals from one or more external devices by example interface circuitry 1206. The cores 1202 may output data, instructions, and/or signals to the one or more external devices by the interface circuitry 1206. Although the cores 1202 of this example include example local memory 1220 (e.g., Level 1 (L1) cache that may be split into an L1 data cache and an L1 instruction cache), the microprocessor 1200 also includes example shared memory 1210 that may be shared by the cores (e.g., Level 2 (L2_cache)) for high-speed access to data and/or instructions. Data and/or instructions may be transferred (e.g., shared) by writing to and/or reading from the shared memory 1210. The local memory 1220 of each of the cores 1202 and the shared memory 1210 may be part of a hierarchy of storage devices including multiple levels of cache memory and the main memory (e.g., the main memory 1114, 1116 of FIG. 11). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1202 may be referred to as a CPU, DSP, GPU, etc., or any other type of hardware circuitry. Each core 1202 includes control unit circuitry 1214, arithmetic and logic (AL) circuitry (sometimes referred to as an ALU) 1216, a plurality of registers 1218, the L1 cache 1220, and an example bus 1222. Other structures may be present. For example, each core 1202 may include vector unit circuitry, single instruction multiple data (SIMD) unit circuitry, load/store unit (LSU) circuitry, branch/jump unit circuitry, floating-point unit (FPU) circuitry, etc. The control unit circuitry 1214 includes semiconductor-based circuits structured to control (e.g., coordinate) data movement within the corresponding core 1202. The AL circuitry 1216 includes semiconductor-based circuits structured to perform one or more mathematic and/or logic operations on the data within the corresponding core 1202. The AL circuitry 1216 of some examples performs integer based operations. In other examples, the AL circuitry 1216 also performs floating point operations. In yet other examples, the AL circuitry 1216 may include first AL circuitry that performs integer based operations and second AL circuitry that performs floating point operations. In some examples, the AL circuitry 1216 may be referred to as an Arithmetic Logic Unit (ALU). The registers 1218 are semiconductor-based structures to store data and/or instructions such as results of one or more of the operations performed by the AL circuitry 1216 of the corresponding core 1202. For example, the registers 1218 may include vector register(s), SIMD register(s), general purpose register(s), flag register(s), segment register(s), machine specific register(s), instruction pointer register(s), control register(s), debug register(s), memory management register(s), machine check register(s), etc. The registers 1218 may be arranged in a bank as shown in FIG. 12. Alternatively, the registers 1218 may be organized in any other arrangement, format, or structure including distributed throughout the core 1202 to shorten access time. The bus 1220 may implement at least one of an I2C bus, a SPI bus, a PCI bus, or a PCIe bus Each core 1202 and/or, more generally, the microprocessor 1200 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1200 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 13:
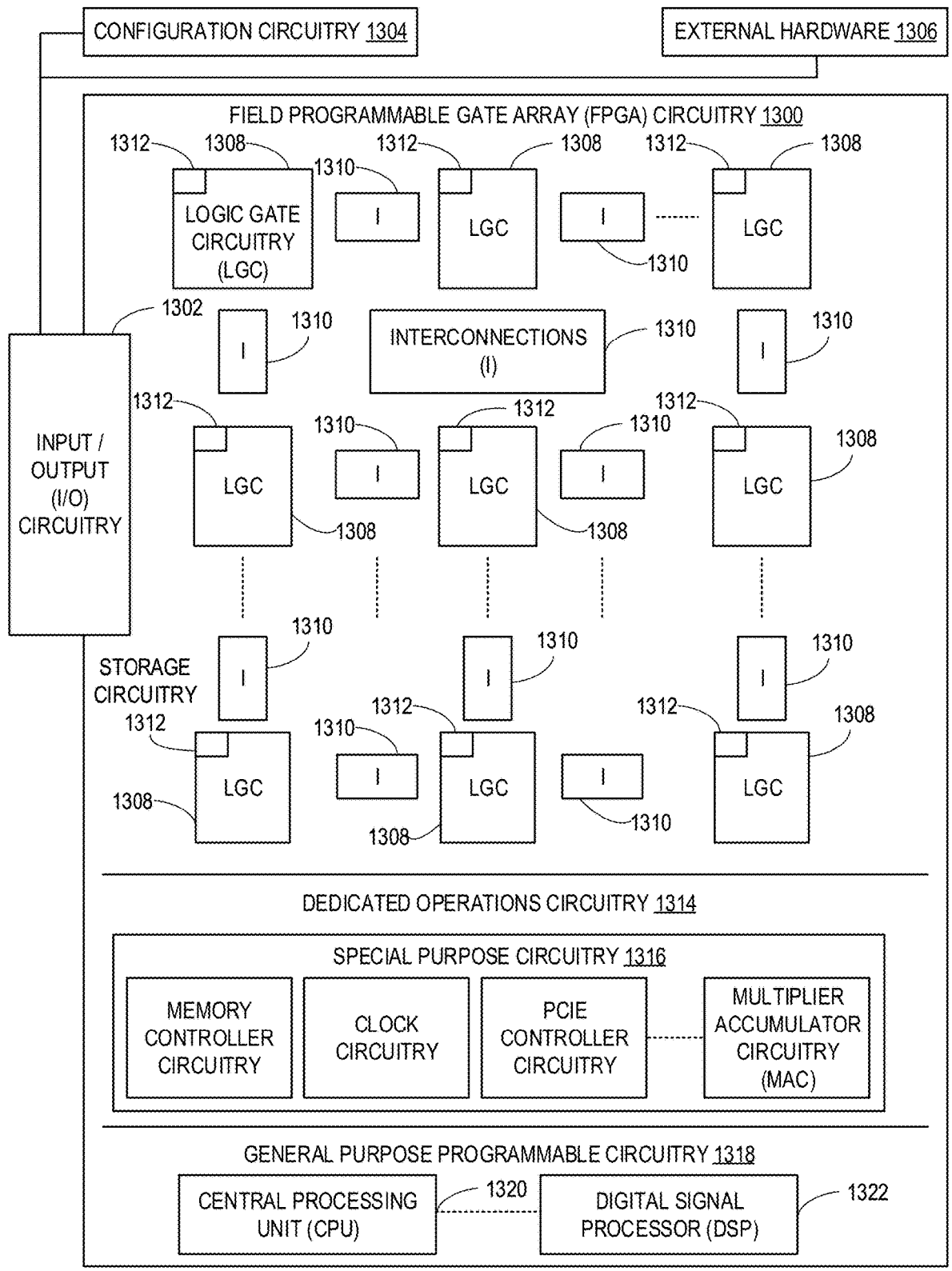
FIG. 13 is a block diagram of another example implementation of the processor circuitry of FIG. 11.

FIG. 13 is a block diagram of another example implementation of the processor circuitry 1112 of FIG. 11. In this example, the processor circuitry 1112 is implemented by FPGA circuitry 1300. The FPGA circuitry 1300 can be used, for example, to perform operations that could otherwise be performed by the example microprocessor 1200 of FIG. 12 executing corresponding machine readable instructions. However, once configured, the FPGA circuitry 1300 instantiates the machine readable instructions in hardware and, thus, can often execute the operations faster than they could be performed by a general purpose microprocessor executing the corresponding software.

More specifically, in contrast to the microprocessor 1200 of FIG. 12 described above (which is a general purpose device that may be programmed to execute some or all of the machine readable instructions represented by the flowchart of FIG. 9 but whose interconnections and logic circuitry are fixed once fabricated), the FPGA circuitry 1300 of the example of FIG. 13 includes interconnections and logic circuitry that may be configured and/or interconnected in different ways after fabrication to instantiate, for example, some or all of the machine readable instructions represented by the flowchart of FIG. 9. In particular, the FPGA 1300 may be thought of as an array of logic gates, interconnections, and switches. The switches can be programmed to change how the logic gates are interconnected by the interconnections, effectively forming one or more dedicated logic circuits (unless and until the FPGA circuitry 1300 is reprogrammed). The configured logic circuits enable the logic gates to cooperate in different ways to perform different operations on data received by input circuitry. Those operations may correspond to some or all of the software represented by the flowchart of FIG. 9. As such, the FPGA circuitry 1300 may be structured to effectively instantiate some or all of the machine readable instructions of the flowchart of FIG. 9 as dedicated logic circuits to perform the operations corresponding to those software instructions in a dedicated manner analogous to an ASIC. Therefore, the FPGA circuitry 1300 may perform the operations corresponding to the some or all of the machine readable instructions of FIG. 9 faster than the general purpose microprocessor can execute the same.

In the example of FIG. 13, the FPGA circuitry 1300 is structured to be programmed (and/or reprogrammed one or more times) by an end user by a hardware description language (HDL) such as Verilog. The FPGA circuitry 1300 of FIG. 13, includes example input/output (I/O) circuitry 1302 to obtain and/or output data to/from example configuration circuitry 1304 and/or external hardware (e.g., external hardware circuitry) 1306. For example, the configuration circuitry 1304 may implement interface circuitry that may obtain machine readable instructions to configure the FPGA circuitry 1300, or portion(s) thereof. In some such examples, the configuration circuitry 1304 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1306 may implement the microprocessor 1200 of FIG. 12. The FPGA circuitry 1300 also includes an array of example logic gate circuitry 1308, a plurality of example configurable interconnections 1310, and example storage circuitry 1312. The logic gate circuitry 1308 and interconnections 1310 are configurable to instantiate one or more operations that may correspond to at least some of the machine readable instructions of FIG. 9 and/or other desired operations. The logic gate circuitry 1308 shown in FIG. 13 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1308 to enable configuration of the electrical structures and/or the logic gates to form circuits to perform desired operations. The logic gate circuitry 1308 may include other electrical structures such as look-up tables (LUTs), registers (e.g., flip-flops or latches), multiplexers, etc.

The interconnections 1310 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1308 to program desired logic circuits.

The storage circuitry 1312 of the illustrated example is structured to store result(s) of the one or more of the operations performed by corresponding logic gates. The storage circuitry 1312 may be implemented by registers or the like. In the illustrated example, the storage circuitry 1312 is distributed amongst the logic gate circuitry 1308 to facilitate access and increase execution speed.

The example FPGA circuitry 1300 of FIG. 13 also includes example Dedicated Operations Circuitry 1314. In this example, the Dedicated Operations Circuitry 1314 includes special purpose circuitry 1316 that may be invoked to implement commonly used functions to avoid the need to program those functions in the field. Examples of such special purpose circuitry 1316 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1300 may also include example general purpose programmable circuitry 1318 such as an example CPU 1320 and/or an example DSP 1322. Other general purpose programmable circuitry 1318 may additionally or alternatively be present such as a GPU, an XPU, etc., that can be programmed to perform other operations.

Although FIGS. 12 and 13 illustrate two example implementations of the processor circuitry 1112 of FIG. 11, many other approaches are contemplated. For example, as mentioned above, modern FPGA circuitry may include an onboard CPU, such as one or more of the example CPU 1320 of FIG. 13. Therefore, the processor circuitry 1112 of FIG. 11 may additionally be implemented by combining the example microprocessor 1200 of FIG. 12 and the example FPGA circuitry 1300 of FIG. 13. In some such hybrid examples, a first portion of the machine readable instructions represented by the flowchart of FIG. 9 may be executed by one or more of the cores 1202 of FIG. 12 and a second portion of the machine readable instructions represented by the flowchart of FIG. 9 may be executed by the FPGA circuitry 1300 of FIG. 13.

In some examples, the processor circuitry 1112 of FIG. 11 may be in one or more packages. For example, the processor circuitry 1200 of FIG. 12 and/or the FPGA circuitry 1300 of FIG. 13 may be in one or more packages. In some examples, an XPU may be implemented by the processor circuitry 1112 of FIG. 11, which may be in one or more packages. For example, the XPU may include a CPU in one package, a DSP in another package, a GPU in yet another package, and an FPGA in still yet another package.

Figure 14:
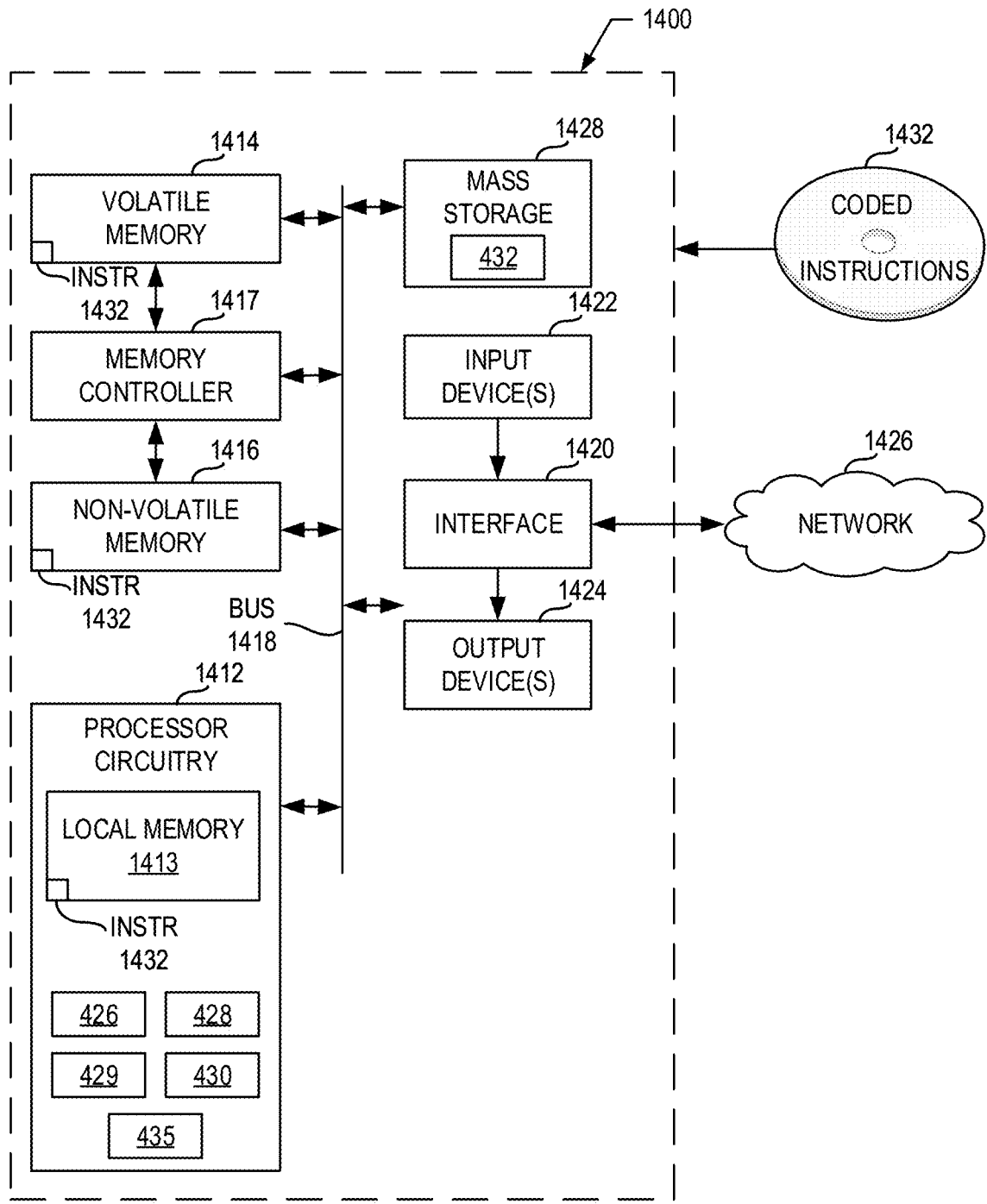
FIG. 14 is a block diagram of an example processor platform including processor circuitry structured to execute and/or instantiate the example machine readable instructions of FIG. 10 to implement the microphone gain control circuitry of FIGS. 3 and/or 4.

FIG. 14 is a block diagram of an example processor platform 1400 structured to execute and/or instantiate the machine readable instructions and/or operations of FIG. 10 to implement the microphone gain control circuitry 330 of FIGS. 3 and/or 4. The processor platform 1400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 1400 of the illustrated example includes processor circuitry 1412. The processor circuitry 1412 of the illustrated example is hardware. For example, the processor circuitry 1412 can be implemented by one or more integrated circuits, logic circuits, FPGAs microprocessors, CPUs, GPUs, DSPs, and/or microcontrollers from any desired family or manufacturer. The processor circuitry 1412 may be implemented by one or more semiconductor based (e.g., silicon based) devices. In this example, the processor circuitry 1412 implements the example low-pass voice filter 426, the example noise estimating circuitry 428, the example calculator 429, the example gain determining circuitry 430, and the example gain control circuitry 435.

The processor circuitry 1412 of the illustrated example includes a local memory 1413 (e.g., a cache, registers, etc.). The processor circuitry 1412 of the illustrated example is in communication with a main memory including a volatile memory 1414 and a non-volatile memory 1416 by a bus 1418. The volatile memory 1414 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1416 may be implemented by flash memory and/or any other desired type of memory device. Access to the main memory 1414, 1416 of the illustrated example is controlled by a memory controller 1417.

The processor platform 1400 of the illustrated example also includes interface circuitry 1420. The interface circuitry 1420 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1422 are connected to the interface circuitry 1420. The input device(s) 1422 permit(s) a user to enter data and/or commands into the processor circuitry 1412. The input device(s) 1422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1424 are also connected to the interface circuitry 1420 of the illustrated example. The output devices 1424 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1420 of the illustrated example, thus, typically includes a graphics driver card, a graphics driver chip, and/or graphics processor circuitry such as a GPU.

The interface circuitry 1420 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1426. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1400 of the illustrated example also includes one or more mass storage devices 1428 to store software and/or data. Examples of such mass storage devices 1428 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1432, which may be implemented by the machine readable instructions of FIG. 10, may be stored in the mass storage device 1428, in the volatile memory 1414, in the non-volatile memory 1416, and/or on a removable non-transitory computer readable storage medium such as a CD or DVD.

Figure 15:
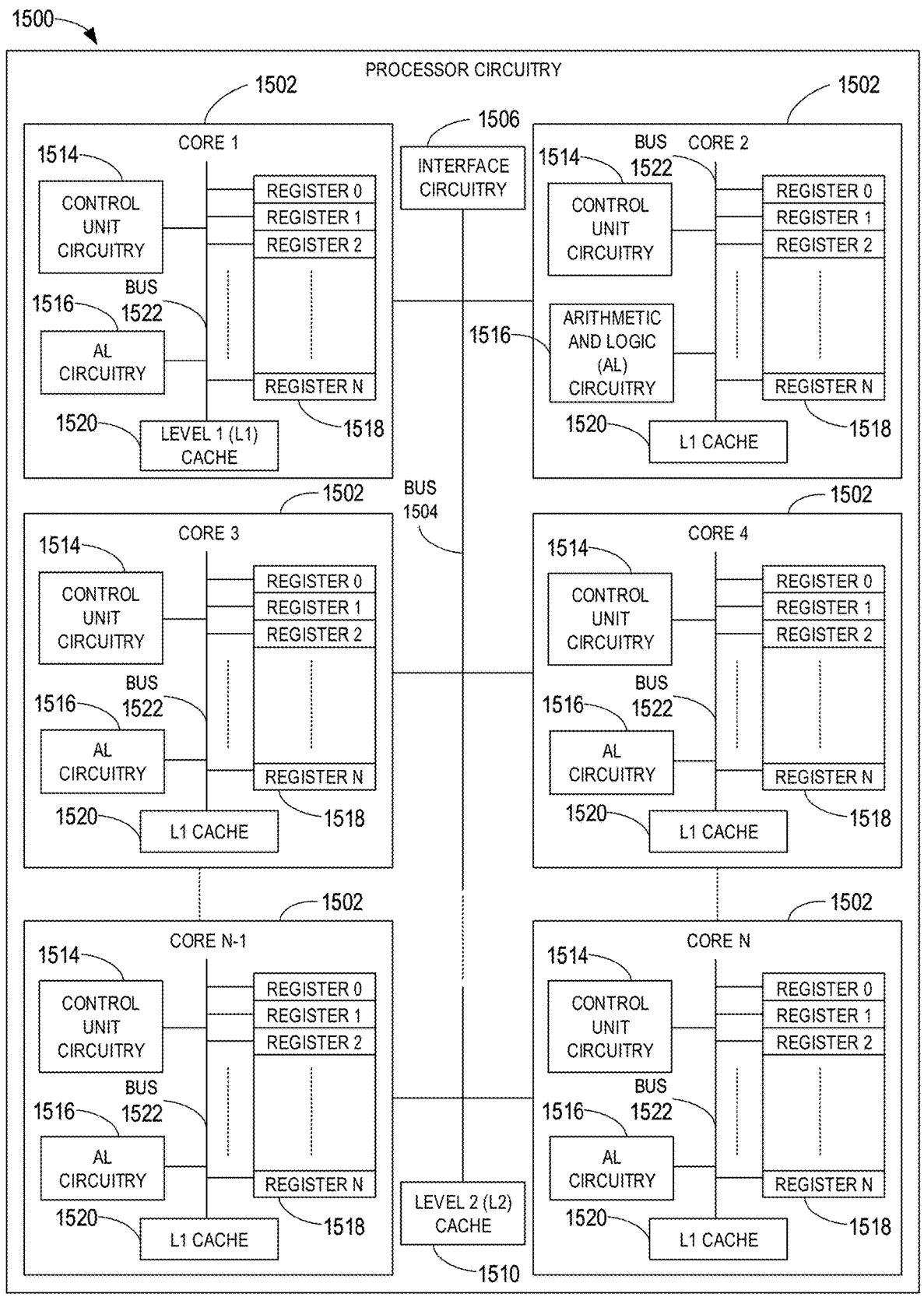
FIG. 15 is a block diagram of an example implementation of the processor circuitry of FIG. 14.

FIG. 15 is a block diagram of an example implementation of the processor circuitry 1412 of FIG. 14. In this example, the processor circuitry 1412 of FIG. 14 is implemented by a microprocessor 1500. For example, the microprocessor 1200 may implement multi-core hardware circuitry such as a CPU, a DSP, a GPU, an XPU, etc. Although it may include any number of example cores 1502 (e.g., 1 core), the microprocessor 1500 of this example is a multi-core semiconductor device including N cores. The cores 1502 of the microprocessor 1500 may operate independently or may cooperate to execute machine readable instructions. For example, machine code corresponding to a firmware program, an embedded software program, or a software program may be executed by one of the cores 1502 or may be executed by multiple ones of the cores 1502 at the same or different times. In some examples, the machine code corresponding to the firmware program, the embedded software program, or the software program is split into threads and executed in parallel by two or more of the cores 1502. The software program may correspond to a portion or all of the machine readable instructions and/or operations represented by the flowchart of FIG. 10.

The cores 1502 may communicate by an example bus 1504. In some examples, the bus 1504 may implement a communication bus to effectuate communication associated with one(s) of the cores 1502. For example, the bus 1504 may implement at least one of an Inter-Integrated Circuit (I2C) bus, a Serial Peripheral Interface (SPI) bus, a PCI bus, or a PCIe bus. Additionally or alternatively, the bus 1504 may implement any other type of computing or electrical bus. The cores 1502 may obtain data, instructions, and/or signals from one or more external devices by example interface circuitry 1506. The cores 1502 may output data, instructions, and/or signals to the one or more external devices by the interface circuitry 1506. Although the cores 1502 of this example include example local memory 1520 (e.g., Level 1 (L1) cache that may be split into an L1 data cache and an L1 instruction cache), the microprocessor 1500 also includes example shared memory 1510 that may be shared by the cores (e.g., Level 2 (L2_cache)) for high-speed access to data and/or instructions. Data and/or instructions may be transferred (e.g., shared) by writing to and/or reading from the shared memory 1510. The local memory 1520 of each of the cores 1502 and the shared memory 1510 may be part of a hierarchy of storage devices including multiple levels of cache memory and the main memory (e.g., the main memory 1414, 1416 of FIG. 14). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1502 may be referred to as a CPU, DSP, GPU, etc., or any other type of hardware circuitry. Each core 1502 includes control unit circuitry 1514, arithmetic and logic (AL) circuitry (sometimes referred to as an ALU) 1516, a plurality of registers 1218, the L1 cache 1520, and an example bus 1522. Other structures may be present. For example, each core 1502 may include vector unit circuitry, single instruction multiple data (SIMD) unit circuitry, load/store unit (LSU) circuitry, branch/jump unit circuitry, floating-point unit (FPU) circuitry, etc. The control unit circuitry 1514 includes semiconductor-based circuits structured to control (e.g., coordinate) data movement within the corresponding core 1502. The AL circuitry 1516 includes semiconductor-based circuits structured to perform one or more mathematic and/or logic operations on the data within the corresponding core 1502. The AL circuitry 1516 of some examples performs integer based operations. In other examples, the AL circuitry 1516 also performs floating point operations. In yet other examples, the AL circuitry 1516 may include first AL circuitry that performs integer based operations and second AL circuitry that performs floating point operations. In some examples, the AL circuitry 1516 may be referred to as an Arithmetic Logic Unit (ALU). The registers 1518 are semiconductor-based structures to store data and/or instructions such as results of one or more of the operations performed by the AL circuitry 1516 of the corresponding core 1502. For example, the registers 1518 may include vector register(s), SIMD register(s), general purpose register(s), flag register(s), segment register(s), machine specific register(s), instruction pointer register(s), control register(s), debug register(s), memory management register(s), machine check register(s), etc. The registers 1518 may be arranged in a bank as shown in FIG. 15. Alternatively, the registers 1518 may be organized in any other arrangement, format, or structure including distributed throughout the core 1502 to shorten access time. The bus 1520 may implement at least one of an I2C bus, a SPI bus, a PCI bus, or a PCIe bus Each core 1502 and/or, more generally, the microprocessor 1500 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1500 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 16:
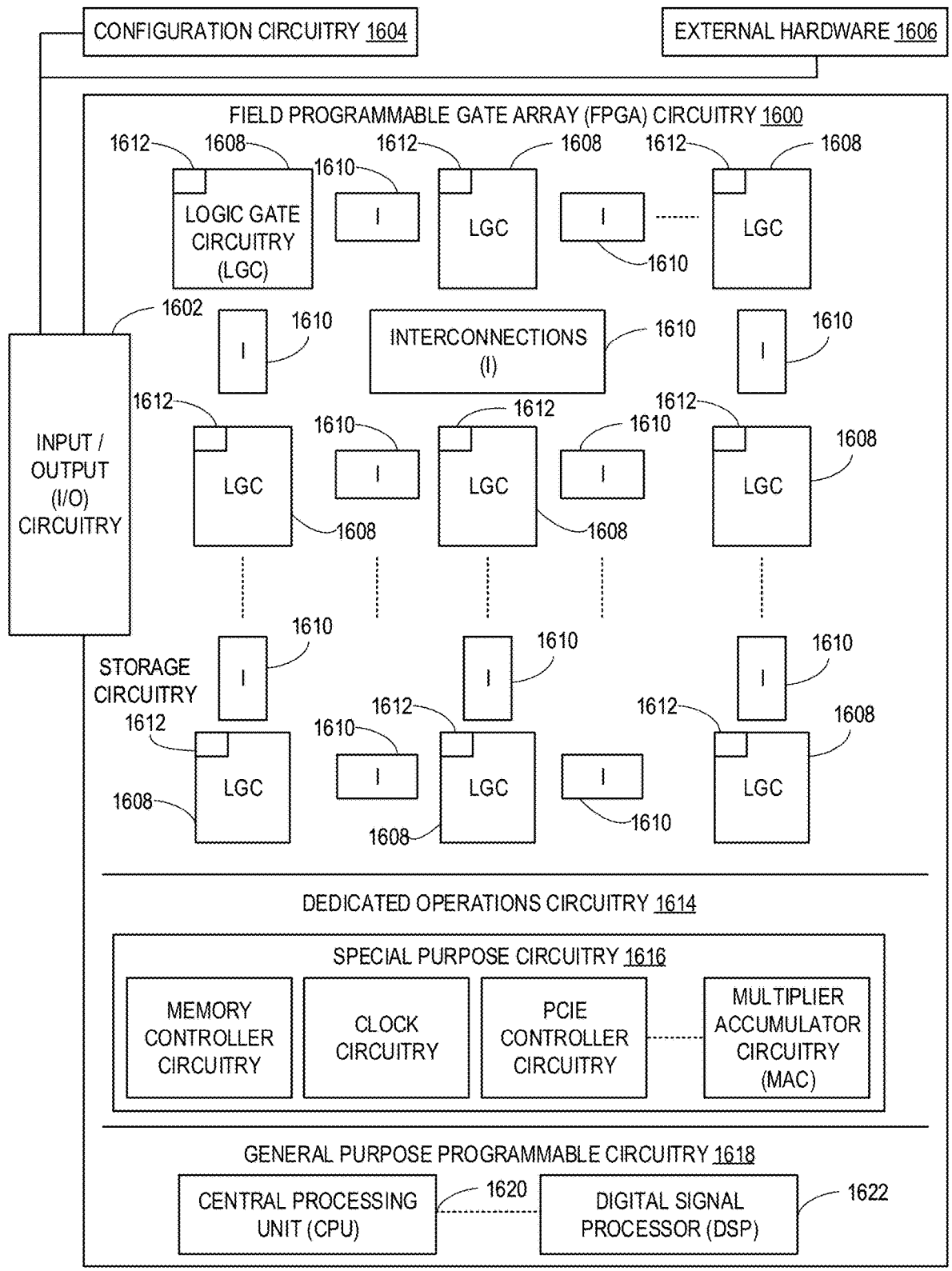
FIG. 16 is a block diagram of another example implementation of the processor circuitry of FIG. 14.

FIG. 16 is a block diagram of another example implementation of the processor circuitry 1412 of FIG. 14. In this example, the processor circuitry 1412 is implemented by FPGA circuitry 1600. The FPGA circuitry 1600 can be used, for example, to perform operations that could otherwise be performed by the example microprocessor 1500 of FIG. 15 executing corresponding machine readable instructions. However, once configured, the FPGA circuitry 1600 instantiates the machine readable instructions in hardware and, thus, can often execute the operations faster than they could be performed by a general purpose microprocessor executing the corresponding software.

More specifically, in contrast to the microprocessor 1500 of FIG. 15 described above (which is a general purpose device that may be programmed to execute some or all of the machine readable instructions represented by the flowchart of FIG. 10 but whose interconnections and logic circuitry are fixed once fabricated), the FPGA circuitry 1600 of the example of FIG. 16 includes interconnections and logic circuitry that may be configured and/or interconnected in different ways after fabrication to instantiate, for example, some or all of the machine readable instructions represented by the flowchart of FIG. 10. In particular, the FPGA 1600 may be thought of as an array of logic gates, interconnections, and switches. The switches can be programmed to change how the logic gates are interconnected by the interconnections, effectively forming one or more dedicated logic circuits (unless and until the FPGA circuitry 1600 is reprogrammed). The configured logic circuits enable the logic gates to cooperate in different ways to perform different operations on data received by input circuitry. Those operations may correspond to some or all of the software represented by the flowchart of FIG. 10. As such, the FPGA circuitry 1600 may be structured to effectively instantiate some or all of the machine readable instructions of the flowchart of FIG. 10 as dedicated logic circuits to perform the operations corresponding to those software instructions in a dedicated manner analogous to an ASIC. Therefore, the FPGA circuitry 1600 may perform the operations corresponding to the some or all of the machine readable instructions of FIG. 10 faster than the general purpose microprocessor can execute the same.

In the example of FIG. 16, the FPGA circuitry 1600 is structured to be programmed (and/or reprogrammed one or more times) by an end user by a hardware description language (HDL) such as Verilog. The FPGA circuitry 1600 of FIG. 16, includes example input/output (I/O) circuitry 1602 to obtain and/or output data to/from example configuration circuitry 1604 and/or external hardware (e.g., external hardware circuitry) 1606. For example, the configuration circuitry 1604 may implement interface circuitry that may obtain machine readable instructions to configure the FPGA circuitry 1600, or portion(s) thereof. In some such examples, the configuration circuitry 1604 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 1606 may implement the microprocessor 1500 of FIG. 15. The FPGA circuitry 1600 also includes an array of example logic gate circuitry 1608, a plurality of example configurable interconnections 1610, and example storage circuitry 1612. The logic gate circuitry 1608 and interconnections 1610 are configurable to instantiate one or more operations that may correspond to at least some of the machine readable instructions of FIG. 10 and/or other desired operations. The logic gate circuitry 1608 shown in FIG. 16 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1608 to enable configuration of the electrical structures and/or the logic gates to form circuits to perform desired operations. The logic gate circuitry 1608 may include other electrical structures such as look-up tables (LUTs), registers (e.g., flip-flops or latches), multiplexers, etc.

The interconnections 1610 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1608 to program desired logic circuits.

The storage circuitry 1612 of the illustrated example is structured to store result(s) of the one or more of the operations performed by corresponding logic gates. The storage circuitry 1612 may be implemented by registers or the like. In the illustrated example, the storage circuitry 1612 is distributed amongst the logic gate circuitry 1608 to facilitate access and increase execution speed.

The example FPGA circuitry 1600 of FIG. 16 also includes example Dedicated Operations Circuitry 1614. In this example, the Dedicated Operations Circuitry 1614 includes special purpose circuitry 1616 that may be invoked to implement commonly used functions to avoid the need to program those functions in the field. Examples of such special purpose circuitry 1616 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1600 may also include example general purpose programmable circuitry 1618 such as an example CPU 1620 and/or an example DSP 1622. Other general purpose programmable circuitry 1618 may additionally or alternatively be present such as a GPU, an XPU, etc., that can be programmed to perform other operations.

Although FIGS. 15 and 16 illustrate two example implementations of the processor circuitry 1412 of FIG. 14, many other approaches are contemplated. For example, as mentioned above, modern FPGA circuitry may include an on-board CPU, such as one or more of the example CPU 1620 of FIG. 16. Therefore, the processor circuitry 1412 of FIG. 14 may additionally be implemented by combining the example microprocessor 1500 of FIG. 15 and the example FPGA circuitry 1600 of FIG. 16. In some such hybrid examples, a first portion of the machine readable instructions represented by the flowchart of FIG. 10 may be executed by one or more of the cores 1502 of FIG. 15 and a second portion of the machine readable instructions represented by the flowchart of FIG. 10 may be executed by the FPGA circuitry 1600 of FIG. 16.

In some examples, the processor circuitry 1412 of FIG. 14 may be in one or more packages. For example, the processor circuitry 1500 of FIG. 15 and/or the FPGA circuitry 1600 of FIG. 16 may be in one or more packages. In some examples, an XPU may be implemented by the processor circuitry 1412 of FIG. 14, which may be in one or more packages. For example, the XPU may include a CPU in one package, a DSP in another package, a GPU in yet another package, and an FPGA in still yet another package.

Figure 17:
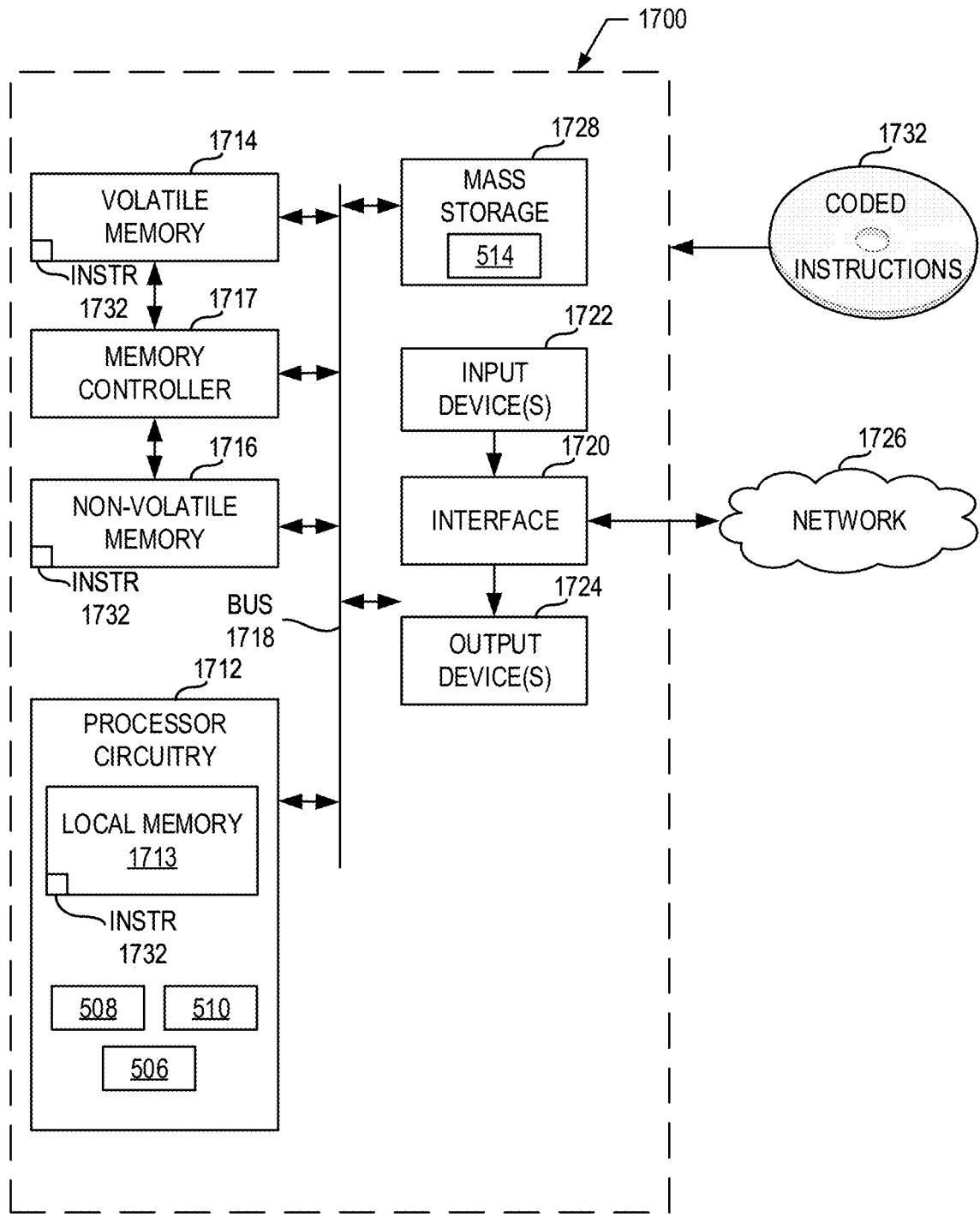
FIG. 17 is a block diagram of an example processor platform including processor circuitry structured to execute and/or instantiate the example machine readable instructions of FIG. 6 to implement the example first neural network generation circuitry of FIG. 5.

FIG. 17 is a block diagram of an example processor platform 1700 structured to execute and/or instantiate the machine readable instructions and/or operations of FIG. 7 to implement the first neural network generation circuitry 504 of FIG. 5. The processor platform 1700 can be, for example, a self-learning machine (e.g., a neural network) or any other type of computing device.

The processor platform 1700 of the illustrated example includes processor circuitry 1712. The processor circuitry 1712 of the illustrated example is hardware. For example, the processor circuitry 1712 can be implemented by one or more integrated circuits, logic circuits, FPGAs microprocessors, CPUs, GPUs, DSPs, and/or microcontrollers from any desired family or manufacturer. The processor circuitry 1712 may be implemented by one or more semiconductor based (e.g., silicon based) devices. In this example, the processor circuitry 1712 implements the example trainer circuitry 508, the example training control circuitry 510, and the example neural network processing circuitry 506.

The processor circuitry 1712 of the illustrated example includes a local memory 1713 (e.g., a cache, registers, etc.). The processor circuitry 1712 of the illustrated example is in communication with a main memory including a volatile memory 1714 and a non-volatile memory 1716 by a bus

1718. The volatile memory 1714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1716 may be implemented by flash memory and/or any other desired type of memory device. Access to the main memory 1714, 1716 of the illustrated example is controlled by a memory controller 1717.

The processor platform 1700 of the illustrated example also includes interface circuitry 1720. The interface circuitry 1720 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1722 are connected to the interface circuitry 1720. The input device(s) 1722 permit(s) a user to enter data and/or commands into the processor circuitry 1712. The input device(s) 1722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1724 are also connected to the interface circuitry 1720 of the illustrated example. The output devices 1724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1720 of the illustrated example, thus, typically includes a graphics driver card, a graphics driver chip, and/or graphics processor circuitry such as a GPU.

The interface circuitry 1720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1700 of the illustrated example also includes one or more mass storage devices 1728 to store software and/or data. Examples of such mass storage devices 1728 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1732, which may be implemented by the machine readable instructions of FIG. 7, may be stored in the mass storage device 1728, in the volatile memory 1714, in the non-volatile memory 1716, and/or on a removable non-transitory computer readable storage medium such as a CD or DVD.

Figure 18:
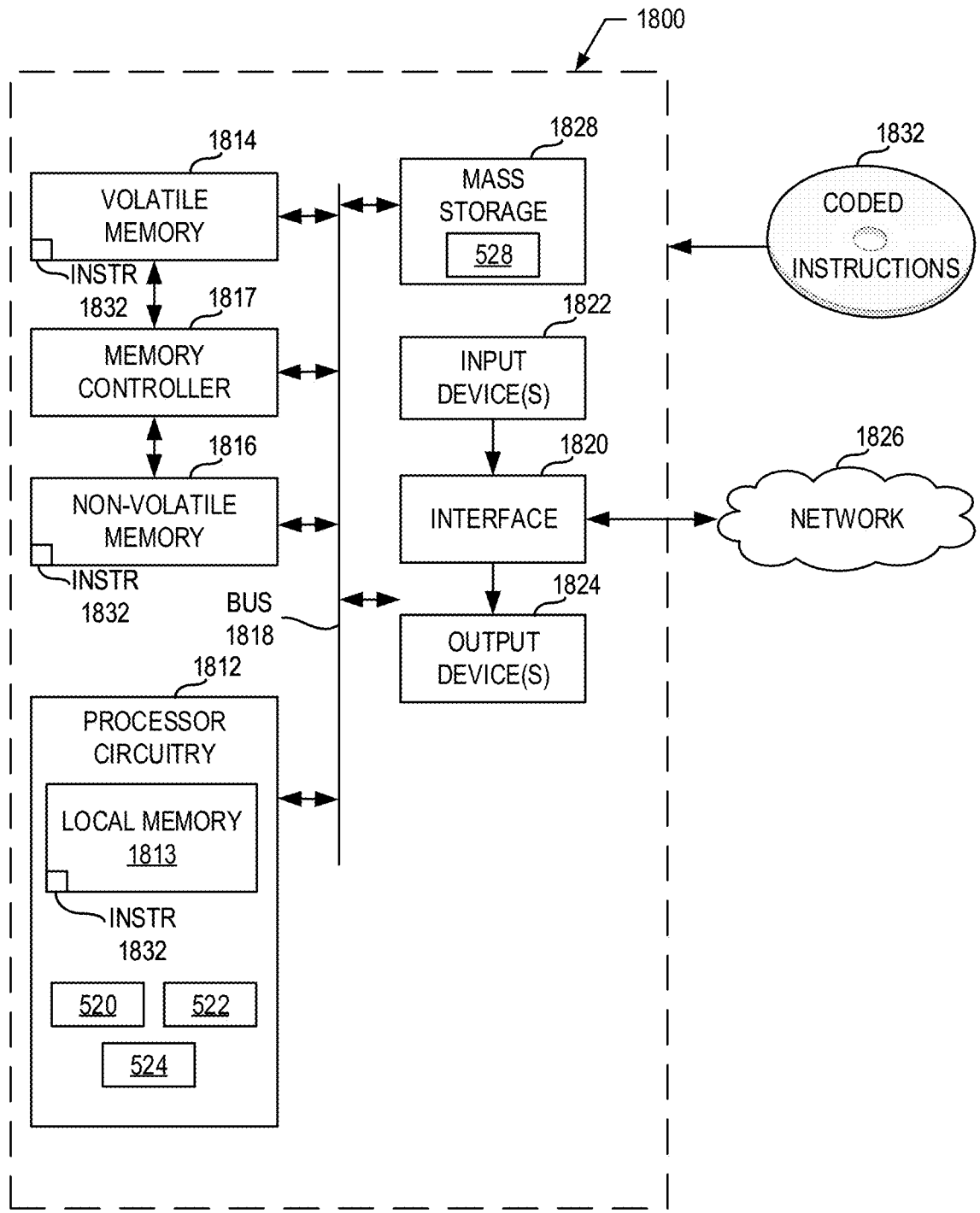
FIG. 18 is a block diagram of an example processor platform including processor circuitry structured to execute and/or instantiate the example machine readable instructions of FIG. 7 to implement the example second neural network generation circuitry of FIG. 5.

FIG. 18 is a block diagram of an example processor platform 1800 structured to execute and/or instantiate the machine readable instructions and/or operations of FIG. 8 to implement the second neural network generation circuitry 518 of FIG. 5. The processor platform 1800 can be, for example, a self-learning machine (e.g., a neural network) or any other type of computing device.

The processor platform 1800 of the illustrated example includes processor circuitry 1812. The processor circuitry 1812 of the illustrated example is hardware. For example, the processor circuitry 1812 can be implemented by one or more integrated circuits, logic circuits, FPGAs microprocessors, CPUs, GPUs, DSPs, and/or microcontrollers from any desired family or manufacturer. The processor circuitry 1812 may be implemented by one or more semiconductor based (e.g., silicon based) devices. In this example, the processor circuitry 1812 implements the example trainer circuitry 520, the example training control circuitry 524, and the example neural network processing circuitry 522.

The processor circuitry 1812 of the illustrated example includes a local memory 1813 (e.g., a cache, registers, etc.). The processor circuitry 1812 of the illustrated example is in communication with a main memory including a volatile memory 1814 and a non-volatile memory 1816 by a bus 1818. The volatile memory 1814 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1816 may be implemented by flash memory and/or any other desired type of memory device. Access to the main memory 1814, 1816 of the illustrated example is controlled by a memory controller 1817.

The processor platform 1700 of the illustrated example also includes interface circuitry 1820. The interface circuitry 1820 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 1822 are connected to the interface circuitry 1820. The input device(s) 1822 permit(s) a user to enter data and/or commands into the processor circuitry 1812. The input device(s) 1822 can be implemented by, for example, an audio sensor, a microphone, a camera (still or video), a keyboard, a button, a mouse, a touchscreen, a track-pad, a trackball, an isopoint device, and/or a voice recognition system.

One or more output devices 1824 are also connected to the interface circuitry 1820 of the illustrated example. The output devices 1824 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1820 of the illustrated example, thus, typically includes a graphics driver card, a graphics driver chip, and/or graphics processor circuitry such as a GPU.

The interface circuitry 1820 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1826. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 1800 of the illustrated example also includes one or more mass storage devices 1828 to store software and/or data. Examples of such mass storage devices 1828 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 1832, which may be implemented by the machine readable instructions of FIG. 8, may be stored in the mass storage device 1828, in the volatile memory 1814, in the non-volatile memory 1816, and/or on a removable non-transitory computer readable storage medium such as a CD or DVD.

Figure 19:
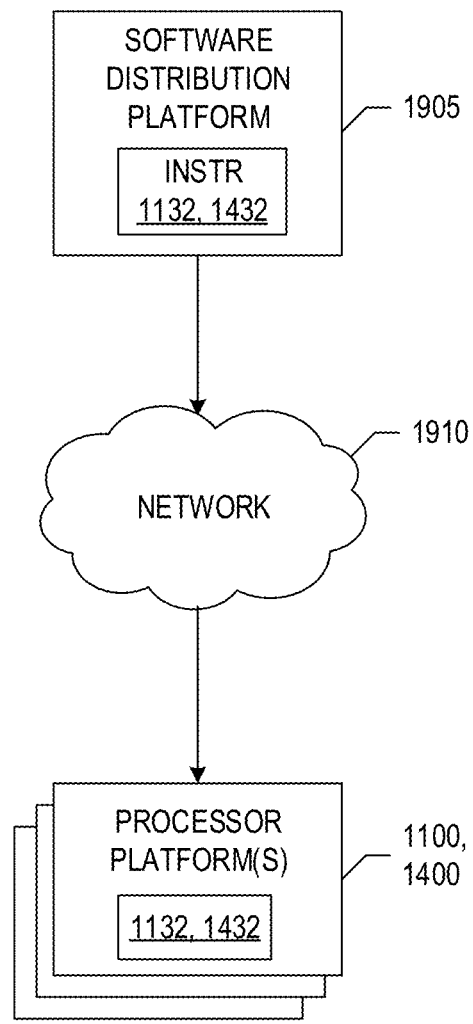
FIG. 19 is a block diagram of an example software distribution platform (e.g., one or more servers) to distribute software (e.g., software corresponding to the example machine readable instructions of FIGS. 9 and/or 10) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1905 to distribute software such as the example machine readable instructions 1132 of FIG. 11 and/or the example machine readable instructions 1432 of FIG. 14 to hardware devices owned and/or operated by third parties is illustrated in FIG. 19. The example software distribution platform 1905 may be implemented by any computer server, data facility, cloud service, etc., capable of storing and transmitting software to other computing devices. The third parties may be customers of the entity owning and/or operating the software distribution platform 1905. For example, the entity that owns and/or operates the software distribution platform 1905 may be a developer, a seller, and/or a licensor of software such as the example machine readable instructions 1132 of FIG. 11 and/or the example machine readable instructions 1432 of FIG. 14. The third parties may be consumers, users, retailers, OEMs, etc., who purchase and/or license the software for use and/or re-sale and/or sub-licensing. In the illustrated example, the software distribution platform 1905 includes one or more servers and one or more storage devices. The storage devices store the machine readable instructions 1132, 1432 which may correspond to the example machine readable instructions 900, 1000 of FIGS. 9 and 10, as described above. The one or more servers of the example software distribution platform 1905 are in communication with a network 1910, which may correspond to any one or more of the Internet and/or any of the example networks 1126, 1426 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1132, 1432 from the software distribution platform 1905. For example, the software, which may correspond to the example machine readable instructions 1132 of FIG. 11, may be downloaded to the example processor platform 1100, which is to execute the machine readable instructions 1132 to implement the user proximity detection circuitry 322. As another example, the software, which may correspond to the example machine readable instructions 1432 of FIG. 14, may be downloaded to the example processor platform 1400, which is to execute the machine readable instructions 1432 to implement the microphone gain control circuitry 330. In some examples, one or more servers of the software distribution platform 1905 periodically offer, transmit, and/or force updates to the software (e.g., the example machine readable instructions 1132 of FIG. 11, the example machine readable instructions 1432 of FIG. 14) to ensure improvements, patches, updates, etc., are distributed and applied to the software at the end user devices.

From the foregoing, it will be appreciated that example systems, methods, apparatus, and articles of manufacture have been disclosed that provide for dynamic adjustments of gain applied to audio captured by microphone(s) associated with a user device based on proximity of a user to the user device. In examples disclosed herein, camera(s) associated with the user output image (e.g., video) data including the user during, for example, a video conference. Examples disclosed herein use facial recognition analysis to identify face(s) in the image data, to select a face as associated with a primary speaker when more than one face is identified, and to identify facial landmarks (e.g., points associated with each of the user's eyes). In examples disclosed herein, the locations of the facial landmarks are used to predict a distance of the user from the camera(s), which serves as a proxy for the distance of the user from the user device. Examples disclosed herein determine an amount of gain to be applied to a voice band of the audio signal based on the predicted user proximity measurements. Examples disclosed herein detect changes in user proximity to the device and dynamically adjust the gain in response to the changes to cause output of audio that provides for substantially consistent volume of the user's voice despite variations in user distance from the device.

Disclosed systems, methods, apparatus, and articles of manufacture improve the efficiency of using a computing device by using image data generated as part of a video conference to determine user proximity to the user device and control audio gain based on the user proximity, rather than using a separate proximity sensors or other hardware. Disclosed systems, methods, apparatus, and articles of manufacture are accordingly directed to one or more improvement(s) in the operation of a machine such as a computer or other electronic and/or mechanical device.

Example apparatus, systems, and methods for microphone gain control for electronic user devices are disclosed herein. Further examples and combinations thereof include the following:

Example 1 includes an apparatus including at least one memory; instructions in the apparatus; and processor circuitry to execute the instructions to determine a proximity of a user to a user device based on an image generated via one or more cameras associated with the user device; determine an amount of gain to be applied to an audio signal generated by a microphone associated with the user device based on the proximity of the user; and cause an amplifier of the user device to apply the gain to the audio signal.

Example 2 includes the apparatus of example 1, wherein the processor circuitry is to detect a face of the user in the image; identify a facial landmark associated with the face in the image; and determine the proximity of the user based on the facial landmark.

Example 3 includes the apparatus of examples 1 or 2, wherein the facial landmark includes a first facial landmark and a second facial landmark and the processor circuitry is to determine a distance between the first facial landmark and the second facial landmark based on first pixel coordinate data associated with the first facial landmark and second pixel coordinate data associated with the second facial landmark and determine the proximity of the user based on the distance between the first facial landmark and the second facial landmark.

Example 4 includes the apparatus of any of examples 1-3, wherein the first facial landmark includes an eye point associated with a first eye of the user and the second facial landmark includes an eye point associated with the second facial landmark.

Example 5 includes the apparatus of any of examples 1-4, wherein the face is a first face, the user is a first use, and the processor circuitry is to detect a second face in the image, the second face associated with a second user; generate a first bounding box for the first face and a second bounding box for the second face; perform a comparison of an area of the first bounding box to an area of the second bounding box; and select the first face for determining the proximity based on the comparison.

Example 6 includes the apparatus of any of examples 1-5, wherein the processor circuitry is to detect a third face in the image, the third face associated with a third user; generate a third bounding box for the third face; assign a first confidence level to the first bounding box, a second confidence level to the second bounding box, and a third confidence level to the third bounding box; and refrain from selecting the third face for determining the proximity based on the third confidence level.

Example 7 includes the apparatus of any of examples 1-6, wherein the processor circuitry is to determine a signal-to-noise ratio of the audio signal; perform a comparison of the signal-to-noise ratio to a threshold; and determine the amount of gain to be applied to the audio signal based on the comparison.

Example 8 includes the apparatus of any of examples 1-7, wherein the processor circuitry is to cause the amplifier to apply the gain to a voice band of the audio signal.

Example 9 includes the apparatus of any of examples 1-8, wherein the image includes a video frame.

Example 10 includes the apparatus of any of examples 1-9, wherein the processor circuitry is to reduce a sampling rate of a video signal and extract the video frame from the video signal having the reduced sampling rate.

Example 11 includes an apparatus including means for detecting a face of a user in a video frame, the video frame associated with a video stream to be generated by a camera, the camera associated with a user device; means for identifying facial landmarks in the face; means for determining a proximity of the user relative to the camera based on the facial landmarks; means for determining a gain to be applied to an audio signal based on the proximity, the audio signal to be generated by a microphone associated with the user; and means for controlling to cause an amplifier of the user device to apply the gain to the audio signal.

Example 12 includes the apparatus of example 11, wherein facial landmarks include a first facial landmark and a second facial landmark, the facial landmark identifying means is to determine a distance between the first facial landmark and the second facial landmark, the proximity determining means to determine the proximity based on the distance.

Example 13 includes the apparatus of examples 11 or 12, further including means for extracting the video frame from the video stream.

Example 14 includes the apparatus of any of examples 11-13, wherein the extracting means is to reduce a sampling rate of the video stream.

Example 15 includes the apparatus of any of examples 11-14, wherein the face detecting means is to generate bounding box in response to detecting the face.

Example 16 includes the apparatus of any of examples 11-15, further including means for filtering the audio signal, the filtering means to remove ambient noise from the audio signal, the gain determining means to cause the amplifier to apply the gain to a voice band of the audio signal.

Example 17 includes the apparatus of any of examples 11-16, further including means for calculating a signal-to-noise ratio of the audio signal, the gain determining means to determine the gain to be applied based on the signal-to-noise ratio.

Example 18 includes at least one non-transitory computer readable storage medium comprising instructions that, when executed, cause processor circuitry to at least determine a proximity of a user to a user device based on an image generated via one or more cameras; determine an amount of gain to be applied to an audio signal generated by a microphone associated with the user device based on the proximity of the user; and cause an amplifier of the user device to apply the gain to the audio signal.

Example 19 includes the at least one non-transitory computer readable storage medium of example 18, wherein the instructions, when executed, cause the processor circuitry to: detect a face of the user in the image; identify a facial landmark associated with the face in the image; and determine the proximity of the user based on the facial landmark.

Example 20 includes the at least one non-transitory computer readable storage medium of examples 18 or 19, wherein the facial landmark includes a first facial landmark and a second facial landmark and the instructions, when executed, cause the processor circuitry to determine a distance between the first facial landmark and the second facial landmark based on first pixel coordinate data associated with the first facial landmark and second pixel coordinate data associated with the second facial landmark; and determine the proximity of the user based on the distance between the first facial landmark and the second facial landmark.

Example 21 includes the at least one non-transitory computer readable storage medium of any of examples 18-20, wherein the first facial landmark includes an eye point associated with a first eye of the user and the second facial landmark includes an eye point associated with the second facial landmark.

Example 22 includes the at least one non-transitory computer readable storage medium of any of examples 18-21, wherein the face is a first face, the user is a first use, and the instructions, when executed, cause the processor circuitry to detect a second face in the image, the second face associated with a second user; generate a first bounding box for the first face and a second bounding box for the second face; perform a comparison of an area of the first bounding box to an area of the second bounding box; and select the first face for determining the proximity based on the comparison.

Example 23 includes the at least one non-transitory computer readable storage medium of any of examples 18-22, wherein the instructions, when executed, cause the processor circuitry to detect a third face in the image, the third face associated with a third user; generate a third bounding box for the third face; assign a first confidence level to the first bounding box, a second confidence level to the second bounding box, and a third confidence level to the third bounding box; and refrain from selecting the third face for determining the proximity based on the third confidence level.

Example 24 includes the at least one non-transitory computer readable storage medium of any of examples 18-23, wherein the instructions, when executed, cause the processor circuitry to determine a signal-to-noise ratio of the audio signal; perform a comparison of the signal-to-noise ratio to a threshold; and determine the amount of gain to be applied to the audio signal based on the comparison.

Example 25 includes the at least one non-transitory computer readable storage medium of any of examples 18-24, wherein the instructions, when executed, cause the processor circuitry to cause the amplifier to apply the gain to a voice band of the audio signal.

Example 26 includes the at least one non-transitory computer readable storage medium of any of examples 18-25, wherein the image includes a video frame.

Example 27 includes an electronic user device including means for generating an audio signal; means for amplifying the audio signal; means for generating an image; and means for processing to determine a proximity of a user relative to the image generating means based on the image; determine an amount of gain to be applied to the audio signal based on the proximity of the user; and cause the amplifying means to apply the gain to the audio signal.

Example 28 includes the electronic user device of example 27, wherein the processing means is to detect a face of the user in the image; identify a first facial landmark and a second facial landmark associated with the face in the image; and determine the proximity of the user based on the first facial landmark and the second facial landmark.

Example 29 includes the electronic user device of examples 27 or 28, wherein the processing means is to determine a distance between the first facial landmark and the second facial landmark based on first pixel coordinate data associated with the first facial landmark and second pixel coordinate data associated with the second facial landmark; and determine the proximity of the user based on the distance between the first facial landmark and the second facial landmark.

Example 30 includes the electronic user device of any of examples 27-29, wherein the processing means is to determine a signal-to-noise ratio of the audio signal; perform a comparison of the signal-to-noise ratio to a threshold; and determine the amount of gain to be applied to the audio signal based on the comparison.

Example 31 includes the electronic user device of any of examples 27-30, wherein the face is a first face, the user is a first user, and the processing means is to detect a second face in the image, the second face associated with a second user; generate a first bounding box for the first face and a second bounding box for the second face; perform a comparison of an area of the first bounding box to an area of the second bounding box; and select the first face for determining the proximity based on the comparison.

Example 32 includes the electronic user device of any of examples 27-31, wherein the image generating means includes a video camera.

Example 33 includes a method including determining, by executing instructions with processor circuitry, a proximity of a user to a user device based on an image generated via one or more cameras associated with the user device; determining, by executing instructions with the processor circuitry, an amount of gain to be applied to an audio signal generated by a microphone associated with the user device based on the proximity of the user; and causing, by executing instructions with the processor circuitry, an amplifier of the user device to apply the gain to the audio signal.

Example 34 includes the method of example 33, further including detecting a face of the user in the image; identifying a facial landmark associated with the face in the image; and determining the proximity of the user based on the facial landmark.

Example 35 includes the method of examples 33 or 34, wherein the facial landmark includes a first facial landmark and a second facial landmark and further including determining a distance between the first facial landmark and the second facial landmark based on first pixel coordinate data associated with the first facial landmark and second pixel coordinate data associated with the second facial landmark; and determining the proximity of the user based on the distance between the first facial landmark and the second facial landmark.

Example 36 includes the method of any of examples 33-35, wherein the first facial landmark includes an eye point associated with a first eye of the user and the second facial landmark includes an eye point associated with the second facial landmark.

Example 37 includes the method of any of examples 33-36, wherein the face is a first face, the user is a first use, and further including detecting a second face in the image, the second face associated with a second user; generating a first bounding box for the first face and a second bounding box for the second face; performing a comparison of an area of the first bounding box to an area of the second bounding box; and selecting the first face for determining the proximity based on the comparison.

Example 38 includes the method of any of examples 33-37, further including detecting a third face in the image, the third face associated with a third user; generating a third bounding box for the third face; assigning a first confidence level to the first bounding box, a second confidence level to the second bounding box, and a third confidence level to the third bounding box; and refraining from selecting the third face for determining the proximity based on the third confidence level.

Example 39 includes the method of any of examples 33-38, further including determining a signal-to-noise ratio of the audio signal; performing a comparison of the signal-to-noise ratio to a threshold; and determining the amount of gain to be applied to the audio signal based on the comparison.

Example 40 includes the method of any of examples 33-39, further including causing the amplifier to apply the gain to a voice band of the audio signal.

Example 41 includes the method of any of examples 33-40, wherein the image includes a video frame.

Example 42 includes an electronic device including interface circuitry to access an input image; and processor circuitry including one or more of at least one of a central processing unit, a graphic processing unit or a digital signal processor, the at least one of the central processing unit, the graphic processing unit or the digital signal processor having control circuitry to control data movement within the processor circuitry, arithmetic and logic circuitry to perform one or more first operations corresponding to instructions, and one or more registers to store a result of the one or more first operations, the instructions in the apparatus; a Field Programmable Gate Array (FPGA), the FPGA including logic gate circuitry, a plurality of configurable interconnections, and storage circuitry, the logic gate circuitry and interconnections to perform one or more second operations, the storage circuitry to store a result of the one or more second operations; or Application Specific Integrate Circuitry (ASIC) including logic gate circuitry to perform one or more third operations; the processor circuitry to perform at least one of the first operations, the second operations, or the third operations to instantiate user proximity detection circuitry to determine a proximity of a user to the electronic device based on the input image; gain determining circuitry to determine an amount of gain to be applied to an audio signal generated by a microphone associated with the user device based on the proximity of the user; and gain control circuitry to cause an amplifier of the user device to apply the gain to the audio signal.

Example 43 includes the electronic device of example 42, wherein the processor circuitry is to perform at least one of the first operations, the second operations, or the third operations to instantiate face detection circuitry to detect a face of the user in the input image; and face landmark detection circuitry to identify a facial landmark associated with the face in the input image.

Example 44 includes the electronic device of examples 42 or 43, wherein the processor circuitry is to perform at least one of the first operations, the second operations, or the third operations to instantiate the user proximity circuitry to determine the proximity of the user based on the facial landmark.

Example 45 includes the electronic user device of any of examples 42-44, wherein the processor circuitry is to perform at least one of the first operations, the second operations, or the third operations to instantiate the user proximity circuitry to determine a distance between the first facial landmark and the second facial landmark based on first pixel coordinate data associated with the first facial landmark and second pixel coordinate data associated with the second facial landmark; and determine the proximity of the user based on the distance between the first facial landmark and the second facial landmark.

Example 46 includes the electronic user device of any of examples 42-45, wherein the processor circuitry is to perform at least one of the first operations, the second operations, or the third operations to instantiate the gain determining circuitry to determine the amount of gain to apply to a voice band of the audio signal.

Example 47 includes the electronic user device of any of examples 42-46, wherein the input image includes a video frame wherein the processor circuitry is to perform at least one of the first operations, the second operations, or the third operations to instantiate video preprocessing circuitry to reduce a sampling rate of a video signal and extract the video frame from the video signal having the reduced sampling rate.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
   at least one memory;
   machine-readable instructions; and
   at least one processor circuit to execute the machine-readable instructions to:
     determine a first proximity value representing a first distance of a user to a user device based on a first image generated via one or more cameras associated with the user device, the first image corresponding to a first time;
     determine a second proximity value representing a second distance of the user to the user device based on a second image generated via the one or more cameras, the second image corresponding to a second time after the first time;
     apply a first filtering parameter to the second proximity value to generate a weighted second proximity value;
     apply a second filtering parameter to the first proximity value to generate a weighted first proximity value, a value of the second filtering parameter adjusted based on the first filtering parameter;
     determine a filtered proximity value corresponding to the second time based on (a) the weighted first proximity value and (b) the weighted second proximity value;
     determine an amount of gain to be applied to an audio signal generated by a microphone associated with the user device based on the filtered proximity value; and
     cause an amplifier of the user device to apply the gain to the audio signal.

2. The apparatus of claim 1, wherein one or more of the at least one processor circuit is to:
   detect a face of the user in the first image;
   identify a facial landmark associated with the face in the first image; and
   determine the first proximity value based on the facial landmark.

3. The apparatus of claim 2, wherein the facial landmark includes a first facial landmark and a second facial landmark and one or more of the at least one processor circuit is to:
   determine a distance between the first facial landmark and the second facial landmark based on first pixel coordinate data associated with the first facial landmark and second pixel coordinate data associated with the second facial landmark; and
   determine the first proximity value based on the distance between the first facial landmark and the second facial landmark.

4. The apparatus of claim 3, wherein the first facial landmark includes a first eye point associated with a first eye of the user and the second facial landmark includes a second eye point associated with the second facial landmark.

5. The apparatus of claim 2, wherein the face is a first face, the user is a first user, and one or more of the at least one processor circuit is to:
   detect a second face in the first image, the second face associated with a second user;
   generate a first bounding box for the first face and a second bounding box for the second face;
   perform a comparison of a first area of the first bounding box to a second area of the second bounding box; and
   select the first face for determining the first proximity value based on the comparison.

6. The apparatus of claim 5, wherein one or more of the at least one processor circuit is to:
   detect a third face in the first image, the third face associated with a third user;
   generate a third bounding box for the third face;
   assign a first confidence level to the first bounding box, a second confidence level to the second bounding box, and a third confidence level to the third bounding box; and
   refrain from selecting the third face for determining the first proximity value based on the third confidence level.

7. The apparatus of claim 1, wherein one or more of the at least one processor circuit is to:
   determine a signal-to-noise ratio of the audio signal;
   perform a comparison of the signal-to-noise ratio to a threshold; and
   determine the amount of the gain to be applied to the audio signal based on the comparison.

8. The apparatus of claim 1, wherein one or more of the at least one processor circuit is to cause the amplifier to apply the gain to a voice band of the audio signal.

9. The apparatus of claim 8, wherein one or more of the at least one processor circuit is to:
  filter the audio signal to (a) permit first frequencies associated with the voice band and (b) remove second frequencies associated with ambient noise; and
  cause the amplifier to apply the gain to the filtered audio signal.

10. An apparatus comprising:
  means for detecting a face of a user in a first video frame corresponding to a first time and in a second video frame corresponding to a second time after the first time, the first video frame and the second video frame associated with a video stream generated by a camera, the camera associated with a user device;
  means for identifying first facial landmarks in the face in the first video frame and second facial landmarks in the face in the second video frame;
  means for determining proximity to:
    determine a first proximity value representing a first distance of the user relative to the camera based on the first facial landmarks;
    determine a second proximity value representing a second distance of the user relative to the camera based on the second facial landmarks;
    apply a first filtering parameter to the second proximity value to generate a weighted second proximity value;
    apply a second filtering parameter to the first proximity value to generate a weighted first proximity value, a value of the second filtering parameter adjusted based on the first filtering parameter; and
    determine a filtered proximity value corresponding to the second time based on (a) the weighted first proximity value and (b) the weighted second proximity value;
  means for determining a gain to be applied to an audio signal based on the filtered proximity value, the audio signal to be generated by a microphone associated with the user;
  means for filtering the audio signal to (a) permit first frequencies associated with a voice band and (b) remove second frequencies associated with ambient noise; and
  means for controlling to cause an amplifier of the user device to apply the gain to the filtered audio signal.

11. The apparatus of claim 10, wherein the first facial landmarks include a third facial landmark and a fourth facial landmark, the facial landmark identifying means is to determine a distance between the third facial landmark and the fourth facial landmark, the proximity determining means to determine the first proximity value based on the distance.

12. The apparatus of claim 10, wherein the face detecting means is to generate a bounding box in response to detecting the face.

13. The apparatus of claim 10, further including means for calculating a signal-to-noise ratio of the audio signal, the gain determining means to determine the gain to be applied based on the signal-to-noise ratio.

14. At least one non-transitory computer readable storage medium comprising machine-readable instructions to cause at least one processor circuit to at least:
  determine a first proximity value representing a first distance of a user to a user device based on a first image generated via one or more cameras, the first image associated with a first time;
  determine a second proximity value representing a second distance of the user to the user device based on a second image generated via the one or more cameras, the second image associated with a second time, the second time after the first time;
  apply a first filtering parameter to the second proximity value to generate a weighted second proximity value;
  apply a second filtering parameter to the first proximity value to generate a weighted first proximity value, a value of the second filtering parameter adjusted based on the first filtering parameter;
  determine a filtered proximity value corresponding to the second time based on the weighted first proximity value and the weighted second proximity value;
  determine an amount of gain to be applied to an audio signal generated by a microphone associated with the user device based on the filtered proximity value;
  filter the audio signal to (a) permit first frequencies associated with a voice band and (b) remove second frequencies associated with ambient noise; and
  cause an amplifier of the user device to apply the gain to the filtered audio signal.

15. The at least one non-transitory computer readable storage medium of claim 14, wherein the machine-readable instructions are to cause one or more of the at least one processor circuit to:
  detect a face of the user in the first image;
  identify a facial landmark associated with the face in the first image; and
  determine the first proximity value of the user based on the facial landmark.

16. The at least one non-transitory computer readable storage medium of claim 15, wherein the facial landmark includes a first facial landmark and a second facial landmark and the machine-readable instructions are to cause one or more of the at least one processor circuit to:
  determine a distance between the first facial landmark and the second facial landmark based on first pixel coordinate data associated with the first facial landmark and second pixel coordinate data associated with the second facial landmark; and
  determine the first proximity value of the user based on the distance between the first facial landmark and the second facial landmark.

17. The at least one non-transitory computer readable storage medium of claim 16, wherein the first facial landmark includes a first eye point associated with a first eye of the user and the second facial landmark includes a second eye point associated with the second facial landmark.

18. The at least one non-transitory computer readable storage medium of claim 15, wherein the face is a first face, the user is a first user, and the machine-readable instructions are to cause one or more of the at least one processor circuit to:
  detect a second face in the first image, the second face associated with a second user;
  generate a first bounding box for the first face and a second bounding box for the second face;
  perform a comparison of a first area of the first bounding box to a second area of the second bounding box; and
  select the first face for determining the first proximity value based on the comparison.

19. The at least one non-transitory computer readable storage medium of claim 18, wherein the machine-readable instructions are to cause one or more of the at least one processor circuit to:
  detect a third face in the first image, the third face associated with a third user;

generate a third bounding box for the third face;

assign a first confidence level to the first bounding box, a second confidence level to the second bounding box, and a third confidence level to the third bounding box; and refrain from selecting the third face for determining the first proximity value based on the third confidence level.

20. The at least one non-transitory computer readable storage medium of claim 14, wherein the machine-readable instructions are to cause one or more of the at least one processor circuit to:

determine a signal-to-noise ratio of the audio signal;

perform a comparison of the signal-to-noise ratio to a threshold; and determine the amount of the gain to be applied to the filtered audio signal based on the comparison.

* * * * *

UNITED STATES PATENT AND TRADEMARK OFFICE
CERTIFICATE OF CORRECTION

| | | |
|---|---|---|
| PATENT NO. | : 12,412,420 B2 | Page 1 of 1 |
| APPLICATION NO. | : 17/358894 | |
| DATED | : September 9, 2025 | |
| INVENTOR(S) | : Thomas | |

It is certified that error appears in the above-identified patent and that said Letters Patent is hereby corrected as shown below:

In the Claims

Column 56, [Claim 15], Line 29, Delete: "of the user"

Column 56, [Claim 16], Line 41, Delete: "of the user"

Signed and Sealed this
Fourth Day of November, 2025

John A. Squires
*Director of the United States Patent and Trademark Office*